(12) United States Patent
Kagaya et al.

(10) Patent No.: US 11,064,109 B2
(45) Date of Patent: Jul. 13, 2021

(54) SHOOTING CONTROL APPARATUS, IMAGE CAPTURE APPARATUS, AND SHOOTING CONTROL METHOD

(71) Applicant: CANON KABUSHIKI KAISHA, Tokyo (JP)

(72) Inventors: Sosuke Kagaya, Tokyo (JP); Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/028,711

(22) Filed: Sep. 22, 2020

(65) Prior Publication Data
US 2021/0099637 A1    Apr. 1, 2021

(30) Foreign Application Priority Data

Sep. 27, 2019 (JP) .............................. JP2019-176641

(51) Int. Cl.
*H04N 5/232* (2006.01)

(52) U.S. Cl.
CPC ..... *H04N 5/23218* (2018.08); *H04N 5/23296* (2013.01); *H04N 5/23299* (2018.08)

(58) Field of Classification Search
CPC ........... H04N 5/23218; H04N 5/23299; H04N 5/23296
USPC .................................................. 348/240.99
See application file for complete search history.

(56) References Cited

U.S. PATENT DOCUMENTS

| 8,885,069 | B2 * | 11/2014 | Kunishige | H04N 5/23219 348/240.1 |
|---|---|---|---|---|
| 8,908,050 | B2 * | 12/2014 | Kino | H04N 5/23218 348/196 |
| 8,970,774 | B2 * | 3/2015 | Tomizawa | H04N 5/23216 348/360 |
| 9,204,053 | B2 * | 12/2015 | Matsuzawa | H04N 5/23216 |
| 9,781,351 | B2 * | 10/2017 | Osawa | H04N 5/23219 |
| 9,955,081 | B2 * | 4/2018 | Niida | H04N 5/23299 |
| 10,304,231 | B2 * | 5/2019 | Saito | H04N 5/232945 |
| 2009/0256933 | A1 * | 10/2009 | Mizukami | H04N 5/232945 348/240.1 |
| 2011/0007191 | A1 * | 1/2011 | Song | H04N 5/232 348/240.99 |
| 2011/0122253 | A1 * | 5/2011 | Kino | H04N 5/23212 348/169 |
| 2011/0267503 | A1 * | 11/2011 | Kunishige | H04N 5/23219 348/240.1 |

(Continued)

FOREIGN PATENT DOCUMENTS

JP    2013-247508 A    12/2013

*Primary Examiner* — Pritham D Prabhakher
(74) *Attorney, Agent, or Firm* — Canon U.S.A., Inc. IP Division

(57) ABSTRACT

A shooting control apparatus obtains image data from an imaging unit that obtains the image data based on light from an imaging optical system, and detects an object from the image data. The apparatus controls rotational driving of the imaging unit and a zoom mechanism included in the imaging optical system based on a result of detection of the object by determining a target zoom position and a shooting direction of the imaging unit. The apparatus determines the target zoom position and the shooting direction so that the object falls within a partial region of a field of view of the imaging unit including a center of the field of view, based on a size and position of the object.

17 Claims, 23 Drawing Sheets

(56) References Cited

U.S. PATENT DOCUMENTS

| | | | |
|---|---|---|---|
| 2015/0281586 A1* | 10/2015 | Mate | H04N 5/23296 |
| | | | 348/240.99 |
| 2016/0027201 A1* | 1/2016 | Saito | G06T 13/80 |
| | | | 345/475 |
| 2016/0142640 A1* | 5/2016 | Niida | H04N 5/23296 |
| | | | 348/240.3 |
| 2017/0104938 A1* | 4/2017 | Shimosato | H04N 5/23251 |
| 2019/0313017 A1* | 10/2019 | Ikeda | G03B 17/18 |

* cited by examiner

FIG.3A

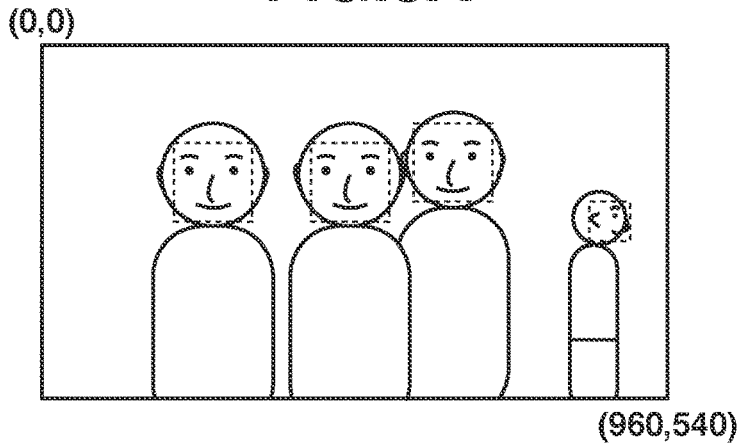

FIG.3B

| NUMBER OF OBJECTS | | 4 |
|---|---|---|
| OBJECT 1 | PRESENCE OR ABSENCE OF FACE REGISTRATION | TRUE |
| | FACE SIZE (w, h) | (120,120) |
| | FACE POSITION (x, y) | (480,210) |
| | FACE ORIENTATION | FRONT |
| OBJECT 2 | PRESENCE OR ABSENCE OF FACE REGISTRATION | FALSE |
| | FACE SIZE (w, h) | (110,110) |
| | FACE POSITION (x, y) | (630,180) |
| | FACE ORIENTATION | FRONT |
| OBJECT 3 | PRESENCE OR ABSENCE OF FACE REGISTRATION | FALSE |
| | FACE SIZE (w, h) | (120,120) |
| | FACE POSITION (x, y) | (270,210) |
| | FACE ORIENTATION | FRONT |
| OBJECT 4 | PRESENCE OR ABSENCE OF FACE REGISTRATION | FALSE |
| | FACE SIZE (w, h) | (60,60) |
| | FACE POSITION (x, y) | (870,270) |
| | FACE ORIENTATION | L90 |

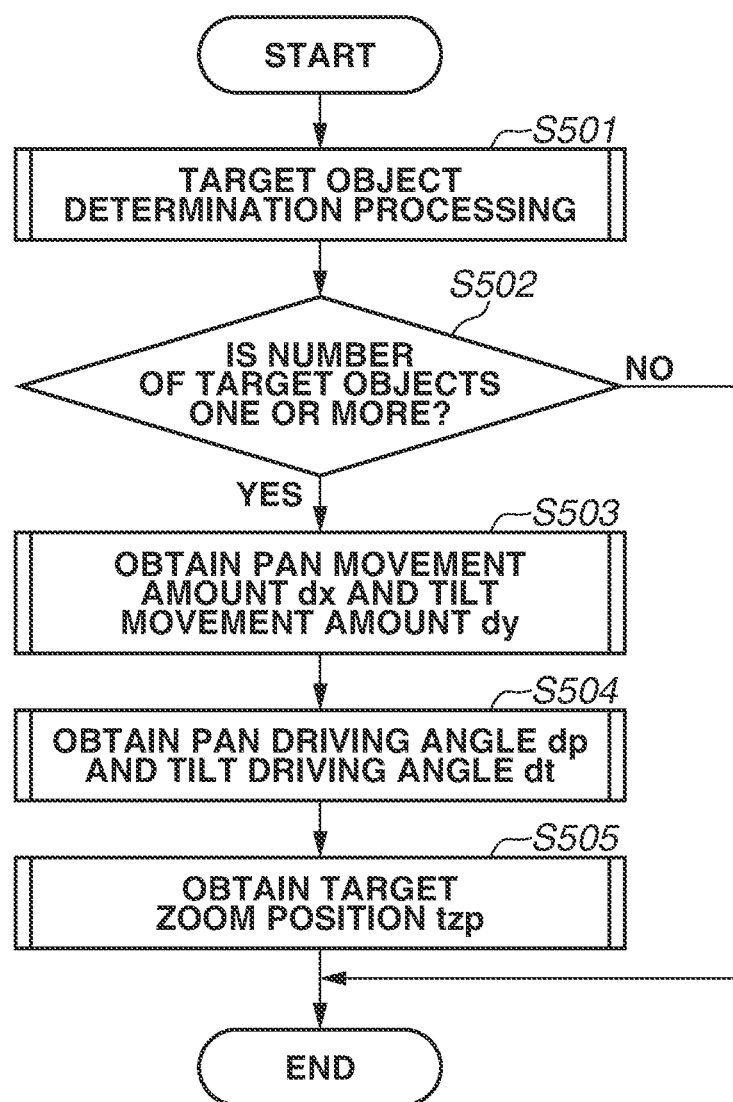

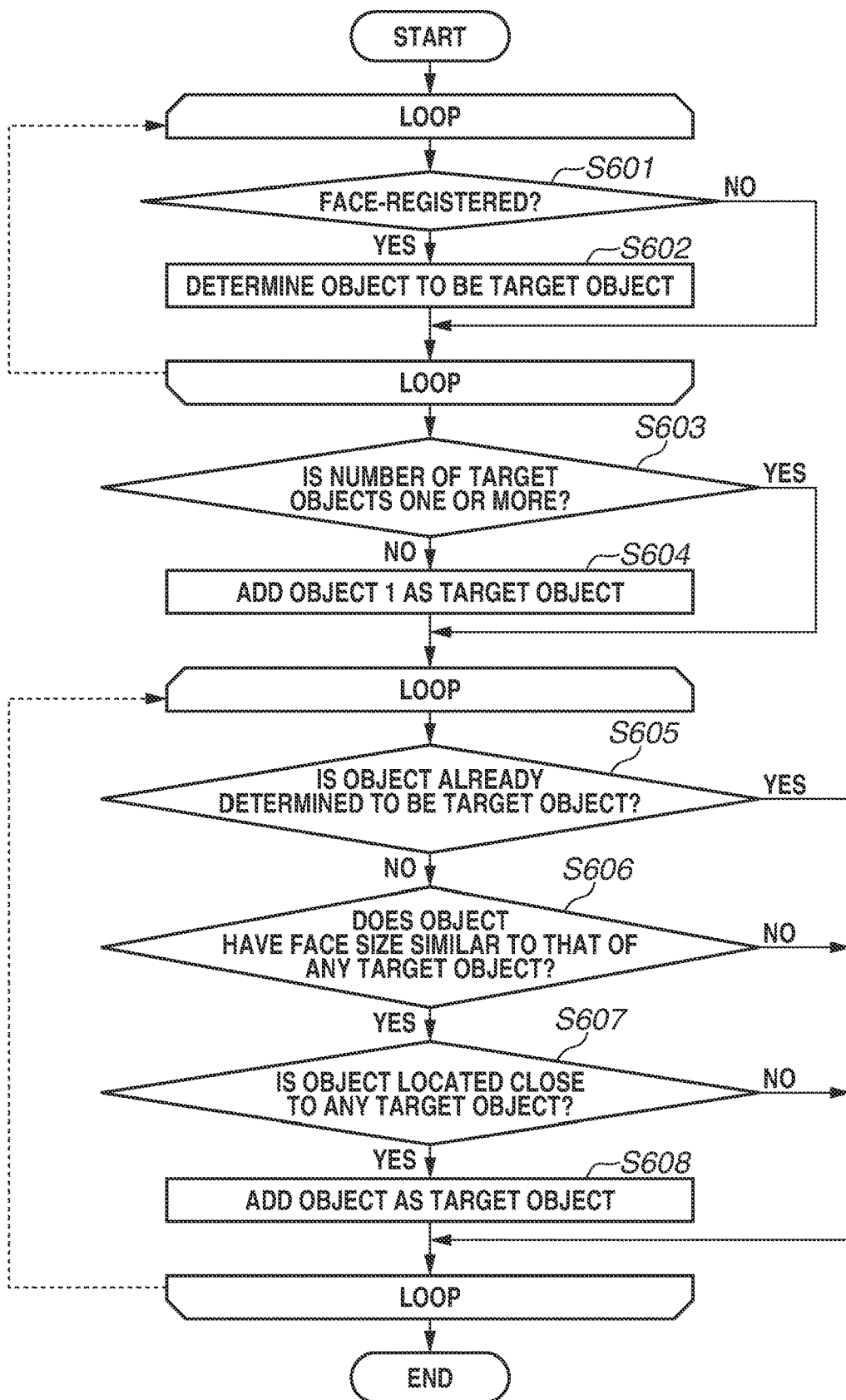

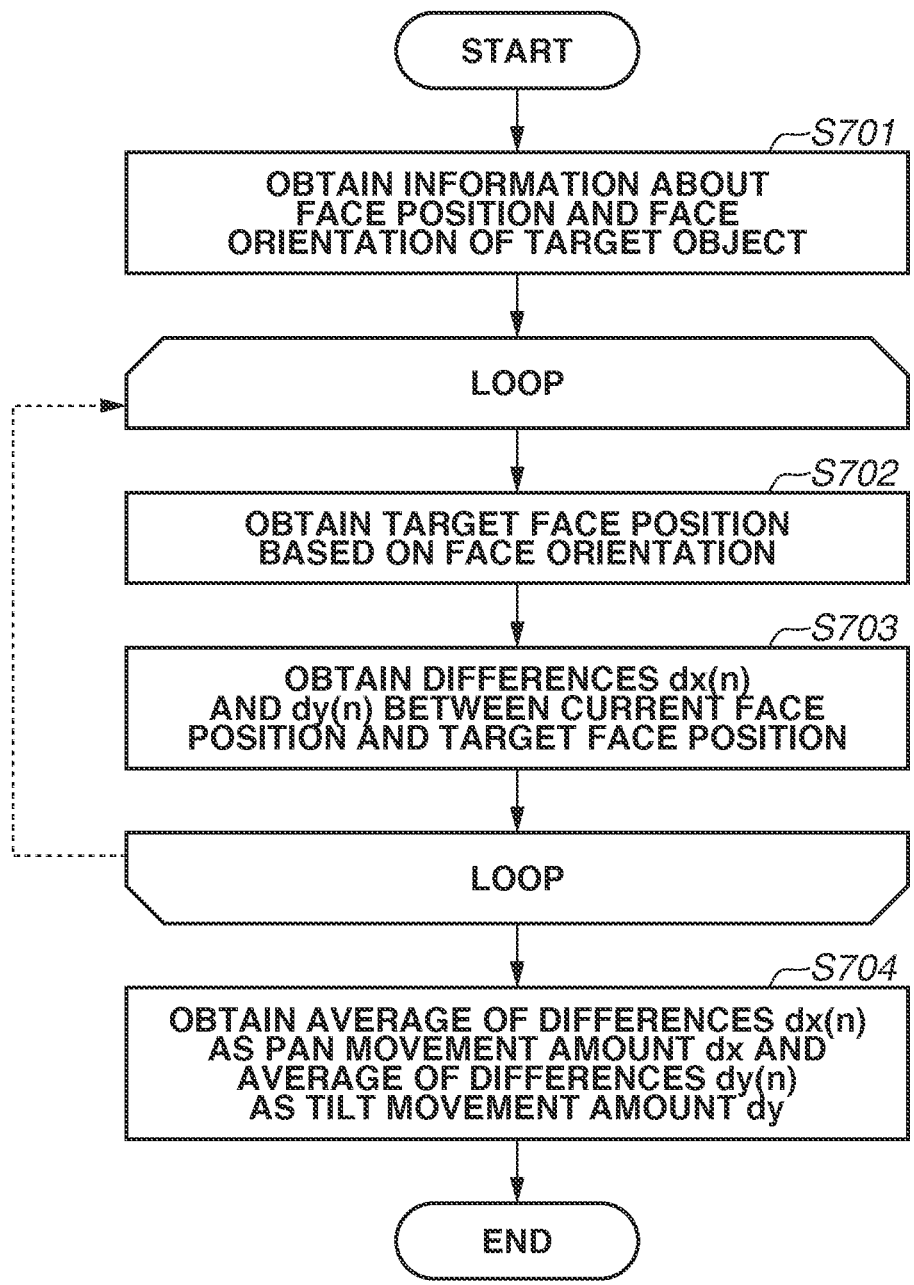

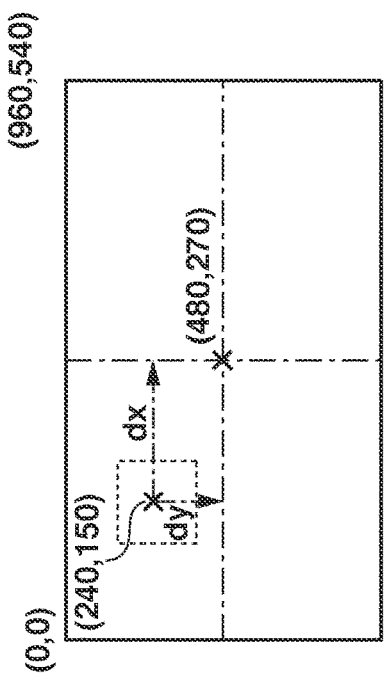
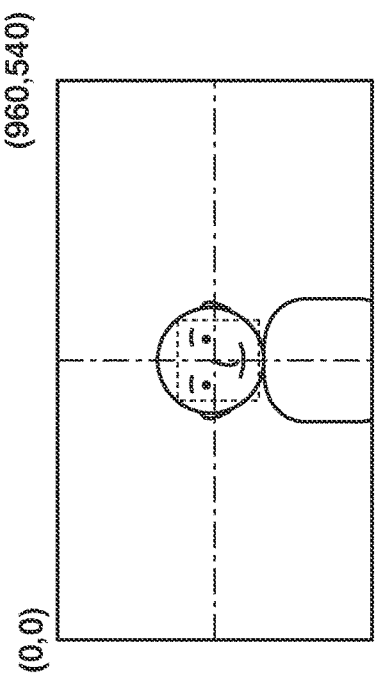
FIG.9A
FIG.9B
| | NUMBER OF OBJECTS | | 1 |
|---|---|---|---|
| OBJECT 1 | PRESENCE OR ABSENCE OF FACE REGISTRATION | | TRUE |
| | FACE SIZE (w, h) | | (150,150) |
| | FACE POSITION (x, y) | | (240,150) |
| | FACE ORIENTATION | | FRONT |
FIG.9C
FIG.9D
| OBJECT 1 | PAN MOVEMENT AMOUNT dx(1) | 240 |
|---|---|---|
| | TILT MOVEMENT AMOUNT dy(1) | 120 |
| | PAN MOVEMENT AMOUNT dx | 240 |
| | TILT MOVEMENT AMOUNT dy | 120 |
FIG.9E

| | NUMBER OF OBJECTS | 1 |
|---|---|---|
| OBJECT 1 | PRESENCE OR ABSENCE OF FACE REGISTRATION | TRUE |
| | FACE SIZE (w, h) | (150,150) |
| | FACE POSITION (x, y) | (210,180) |
| | FACE ORIENTATION | R90 |

| | PAN MOVEMENT AMOUNT dx(1) | 558 |
|---|---|---|
| OBJECT 1 | TILT MOVEMENT AMOUNT dy(1) | 90 |
| | PAN MOVEMENT AMOUNT dx | 558 |
| | TILT MOVEMENT AMOUNT dy | 90 |

| | NUMBER OF OBJECTS | 1 |
|---|---|---|
| OBJECT 1 | PRESENCE OR ABSENCE OF FACE REGISTRATION | TRUE |
| | FACE SIZE (w, h) | (210,210) |
| | FACE POSITION (x, y) | (690,390) |
| | FACE ORIENTATION | R90 |

| | PAN MOVEMENT AMOUNT dx(1) | -498 |
|---|---|---|
| OBJECT 1 | TILT MOVEMENT AMOUNT dy(1) | -120 |
| | PAN MOVEMENT AMOUNT dx | -498 |
| | TILT MOVEMENT AMOUNT dy | -120 |

FIG.12A
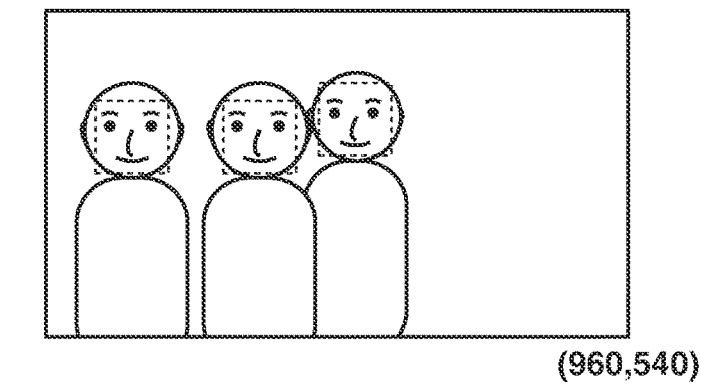
FIG.12B
| NUMBER OF OBJECTS | | 3 |
|---|---|---|
| OBJECT 1 | PAN MOVEMENT AMOUNT dx(1) | 120 |
| | TILT MOVEMENT AMOUNT dy(1) | 60 |
| OBJECT 2 | PAN MOVEMENT AMOUNT dx(2) | -30 |
| | TILT MOVEMENT AMOUNT dy(2) | 90 |
| OBJECT 3 | PAN MOVEMENT AMOUNT dx(3) | 330 |
| | TILT MOVEMENT AMOUNT dy(3) | 60 |
| PAN MOVEMENT AMOUNT dx | | 140 |
| TILT MOVEMENT AMOUNT dy | | 70 |
FIG.12C
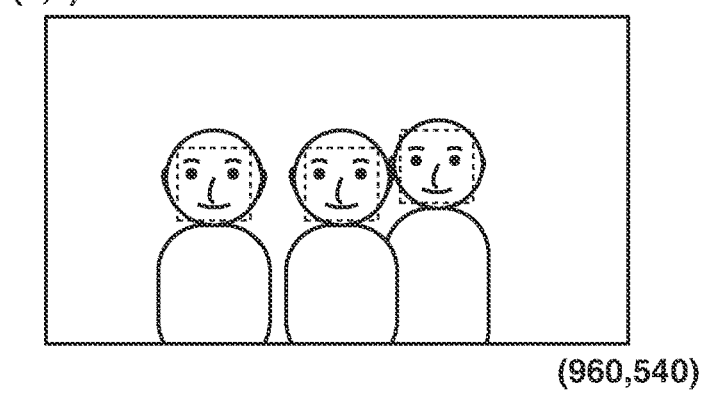

FIG. 13A
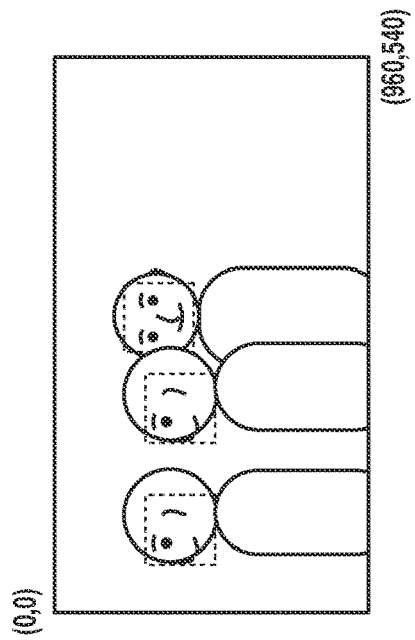
FIG. 13B
| NUMBER OF OBJECTS | | 3 |
|---|---|---|
| OBJECT 1 | PAN MOVEMENT AMOUNT dx(2) | -30 |
| | TILT MOVEMENT AMOUNT dy(2) | 90 |
| OBJECT 2 | PAN MOVEMENT AMOUNT dx(1) | 408 |
| | TILT MOVEMENT AMOUNT dy(1) | 60 |
| OBJECT 3 | PAN MOVEMENT AMOUNT dx(3) | 618 |
| | TILT MOVEMENT AMOUNT dy(3) | 60 |
| PAN MOVEMENT AMOUNT dx | | 332 |
| TILT MOVEMENT AMOUNT dy | | 70 |
FIG. 13C
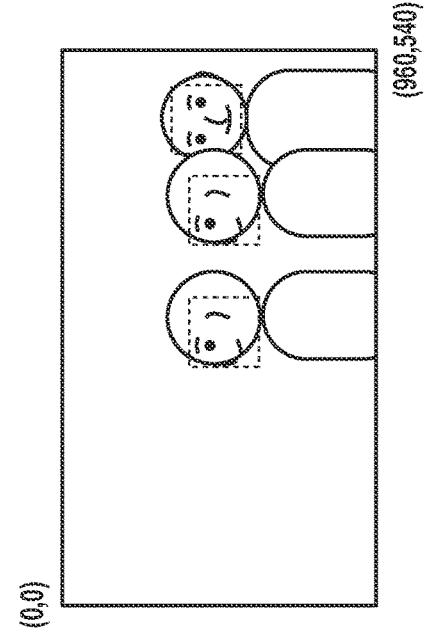
FIG. 13D
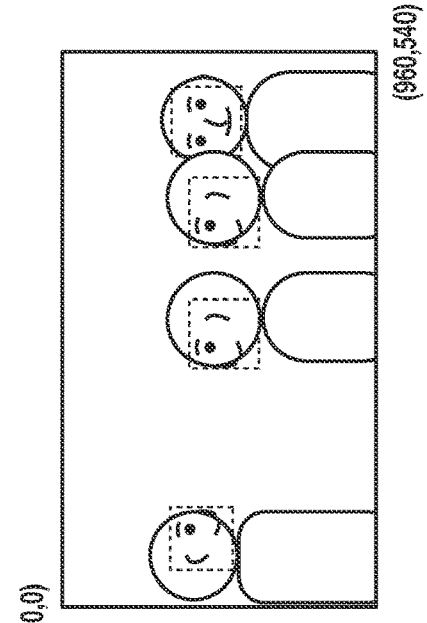

FIG.14

| ZOOM POSITION zp | RELATIVE ANGLE OF VIEW aov (zp) | ZOOM POSITION zp | RELATIVE ANGLE OF VIEW aov (zp) |
|---|---|---|---|
| 0 | 1000 | 51 | 702 |
| 1 | 993 | 52 | 698 |
| 2 | 986 | 53 | 693 |
| 3 | 979 | 54 | 688 |
| 4 | 973 | 55 | 683 |
| 5 | 966 | 56 | 679 |
| 6 | 959 | 57 | 674 |
| 7 | 953 | 58 | 669 |
| 8 | 946 | 59 | 665 |
| 9 | 940 | 60 | 660 |
| 10 | 933 | 61 | 655 |
| 11 | 927 | 62 | 651 |
| 12 | 920 | 63 | 646 |
| 13 | 914 | 64 | 642 |
| 14 | 908 | 65 | 638 |
| 15 | 901 | 66 | 633 |
| 16 | 895 | 67 | 629 |
| 17 | 889 | 68 | 624 |
| 18 | 883 | 69 | 620 |
| 19 | 877 | 70 | 616 |
| 20 | 871 | 71 | 612 |
| 21 | 865 | 72 | 607 |
| 22 | 859 | 73 | 603 |
| 23 | 853 | 74 | 599 |
| 24 | 847 | 75 | 595 |
| 25 | 841 | 76 | 591 |
| 26 | 835 | 77 | 587 |
| 27 | 829 | 78 | 583 |
| 28 | 824 | 79 | 579 |
| 29 | 818 | 80 | 575 |
| 30 | 812 | 81 | 571 |
| 31 | 807 | 82 | 567 |
| 32 | 801 | 83 | 563 |
| 33 | 796 | 84 | 559 |
| 34 | 790 | 85 | 555 |
| 35 | 785 | 86 | 551 |
| 36 | 779 | 87 | 548 |
| 37 | 774 | 88 | 544 |
| 38 | 769 | 89 | 540 |
| 39 | 763 | 90 | 536 |
| 40 | 758 | 91 | 533 |
| 41 | 753 | 92 | 529 |
| 42 | 748 | 93 | 525 |
| 43 | 743 | 94 | 522 |
| 44 | 737 | 95 | 518 |
| 45 | 732 | 96 | 514 |
| 46 | 727 | 97 | 511 |
| 47 | 722 | 98 | 507 |
| 48 | 717 | 99 | 504 |
| 49 | 712 | 100 | 500 |
| 50 | 707 | | |

FIG.16

| COMPOSITION PATTERN | TARGET FACE SIZE (%) | | | TARGET OBJECT REGION (%) |
|---|---|---|---|---|
| | MINIMUM VALUE | MAXIMUM VALUE | MEDIAN | MAXIMUM VALUE |
| SMALL | 5 | 10 | 7.5 | 80 |
| MEDIUM | 10 | 15 | 12.5 | 70 |
| LARGE | 15 | 20 | 17.5 | — |

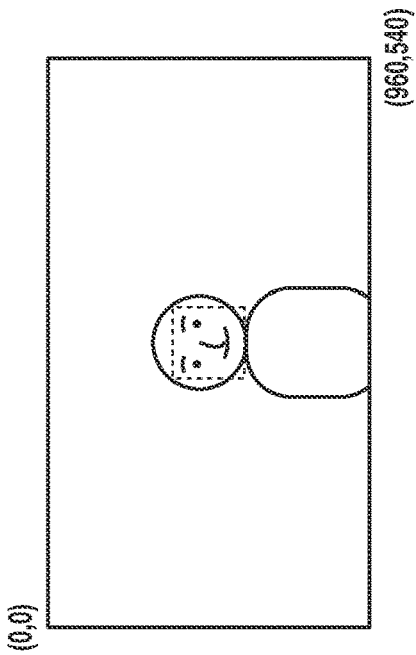
FIG. 18A
FIG. 18B
| NUMBER OF OBJECTS | | 1 |
|---|---|---|
| OBJECT 1 | FACE SIZE (w, h) | (120,120) |
| | FACE POSITION (x, y) | (480,270) |
| ZOOM POSITION zp | | 30 |
| COMPOSITION PATTERN | | LARGE |
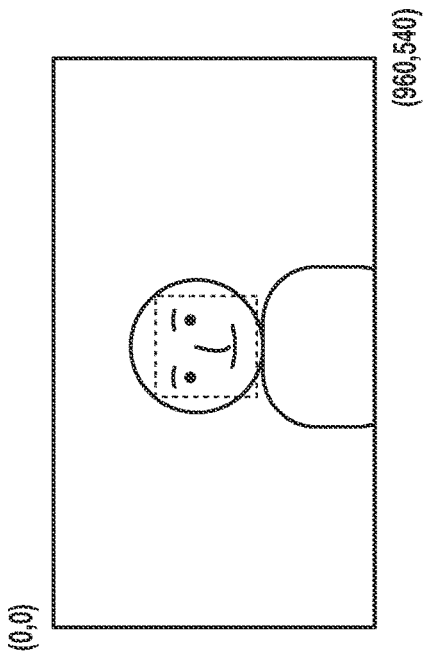
FIG. 18C

FIG.19B
| NUMBER OF OBJECTS | | 3 |
|---|---|---|
| OBJECT 1 | FACE SIZE (w, h) | (120,120) |
| | FACE POSITION (x, y) | (470,270) |
| OBJECT 2 | FACE SIZE (w, h) | (120,120) |
| | FACE POSITION (x, y) | (220,240) |
| OBJECT 3 | FACE SIZE (w, h) | (120,120) |
| | FACE POSITION (x, y) | (720,300) |
| ZOOM POSITION zp | | 70 |
| COMPOSITION PATTERN | | SMALL |
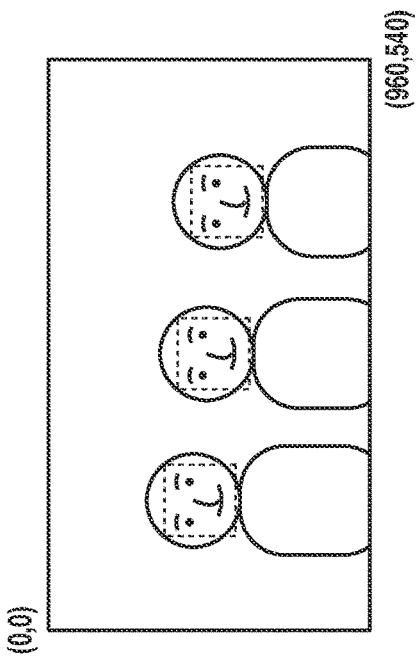
FIG.19A
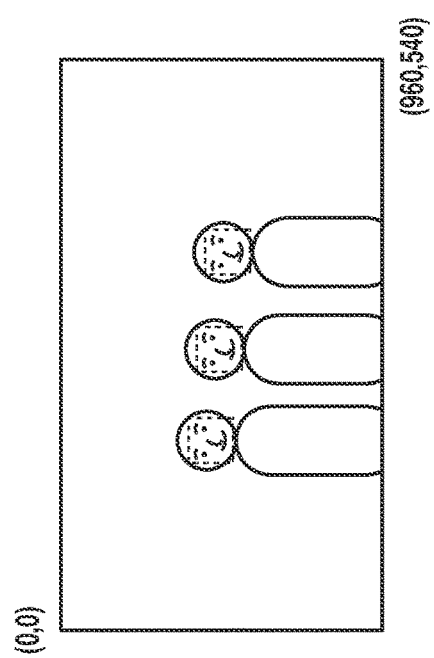
FIG.19C

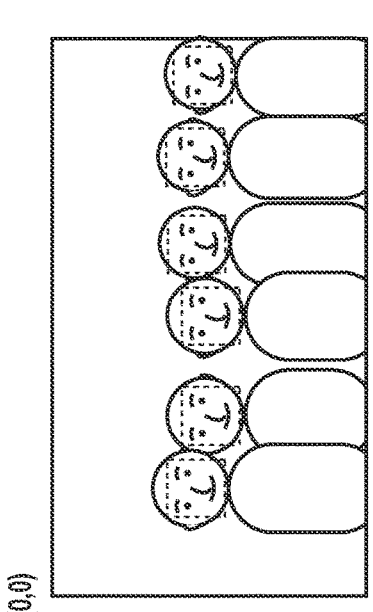
FIG.20B
| NUMBER OF OBJECTS | | 5 |
|---|---|---|
| OBJECT 1 | FACE SIZE (w, h) | (120,120) |
| | FACE POSITION (x, y) | (480,270) |
| OBJECT 2 | FACE SIZE (w, h) | (120,120) |
| | FACE POSITION (x, y) | (630,240) |
| OBJECT 3 | FACE SIZE (w, h) | (120,120) |
| | FACE POSITION (x, y) | (270,270) |
| OBJECT 4 | FACE SIZE (w, h) | (120,120) |
| | FACE POSITION (x, y) | (810,240) |
| OBJECT 5 | FACE SIZE (w, h) | (120,120) |
| | FACE POSITION (x, y) | (120,240) |
| ZOOM POSITION zp | | 50 |
| COMPOSITION PATTERN | | MEDIUM |
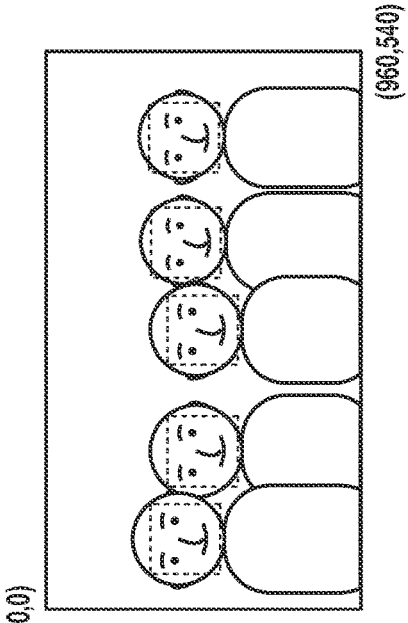
FIG.20A
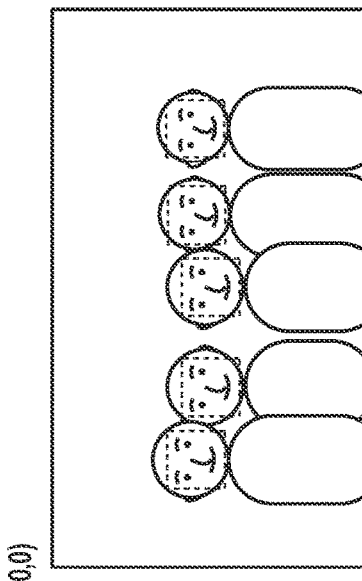
FIG.20D
FIG.20C

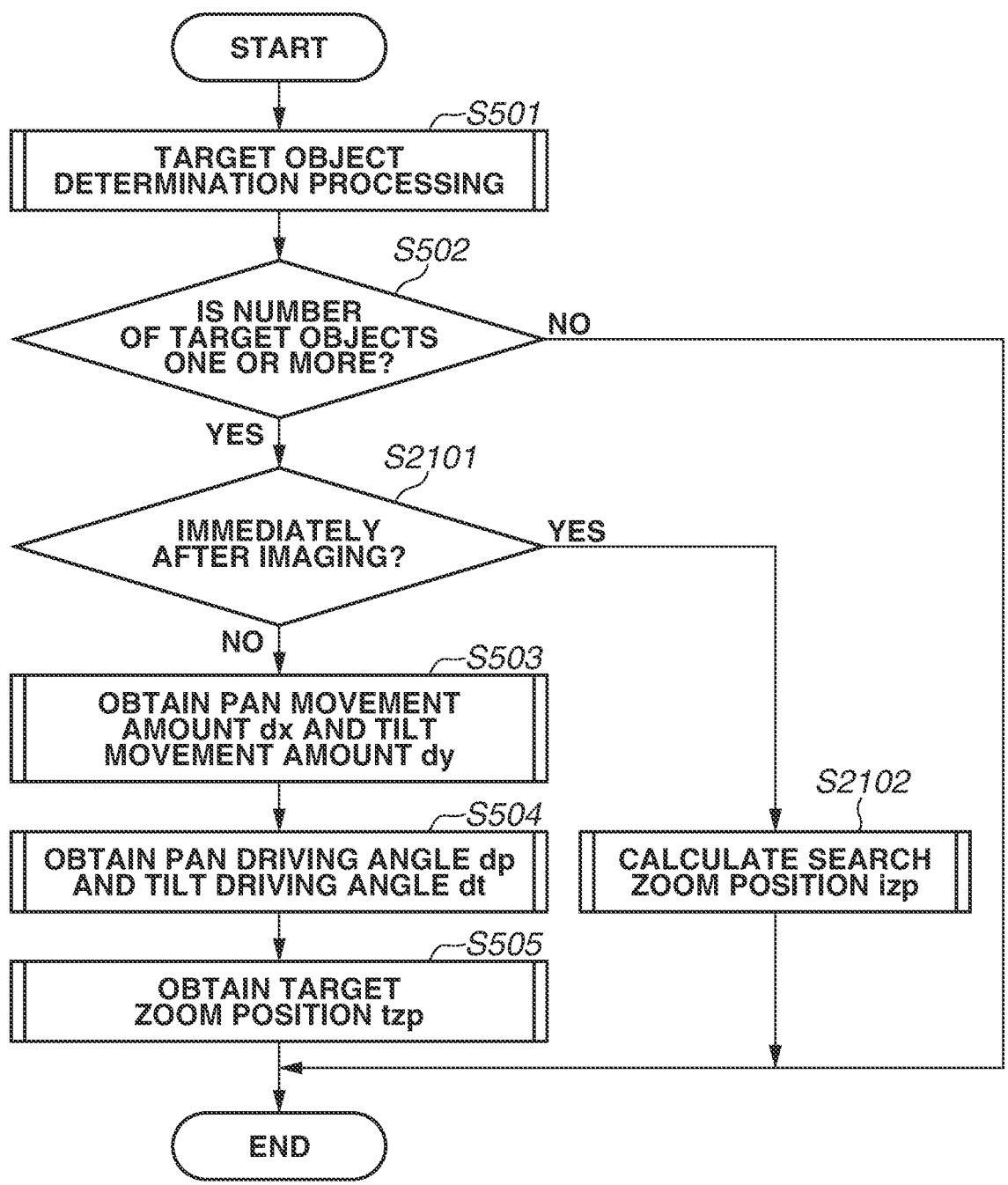

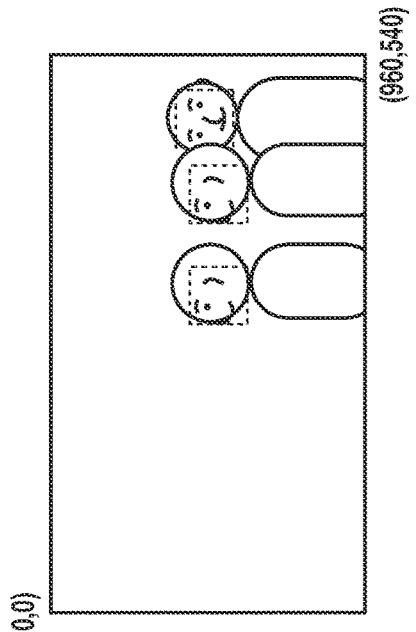
FIG.22A
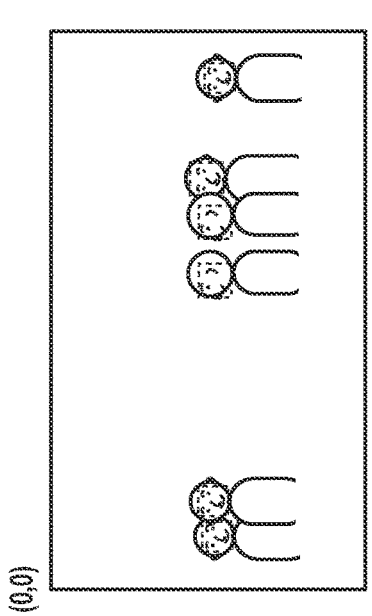
FIG.22B
FIG.22C
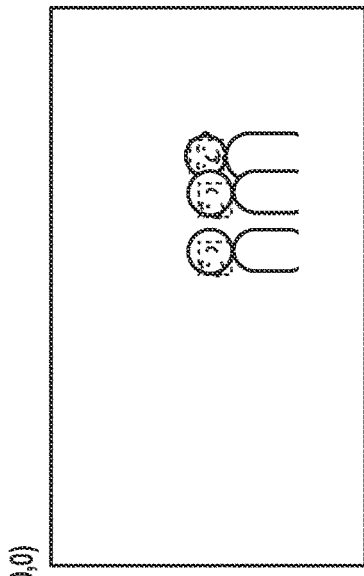
FIG.22D

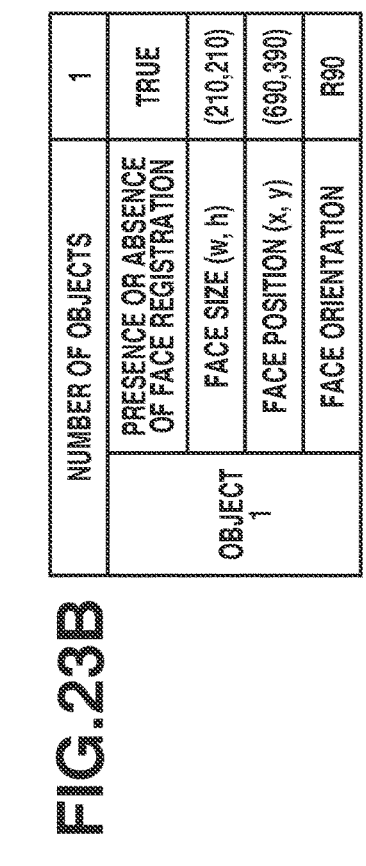
FIG.23A
FIG.23B
| | NUMBER OF OBJECTS | | 1 |
|---|---|---|---|
| OBJECT 1 | PRESENCE OR ABSENCE OF FACE REGISTRATION | | TRUE |
| | FACE SIZE (w, h) | | (210,210) |
| | FACE POSITION (x, y) | | (690,390) |
| | FACE ORIENTATION | | R90 |
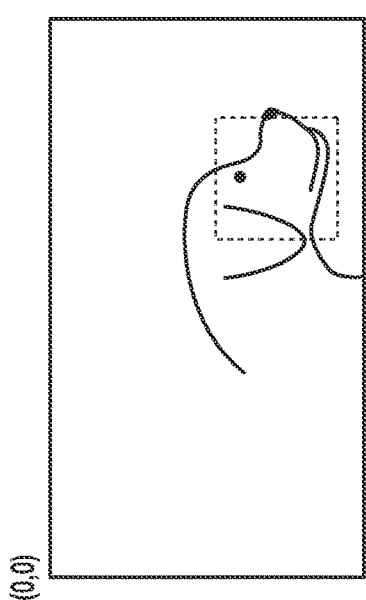
FIG.23C
FIG.23D
| | PAN MOVEMENT AMOUNT dx(1) | -498 |
|---|---|---|
| OBJECT 1 | TILT MOVEMENT AMOUNT dy(1) | -120 |
| | PAN MOVEMENT AMOUNT dx | -498 |
| | TILT MOVEMENT AMOUNT dy | -120 |
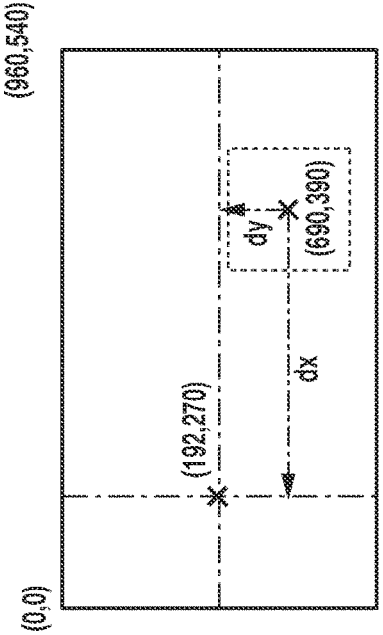
FIG.23E
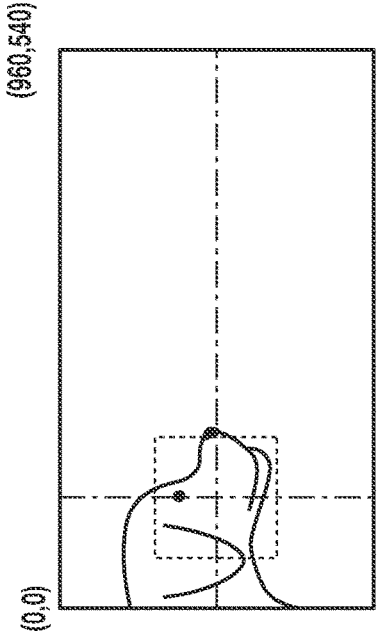
FIG.23F
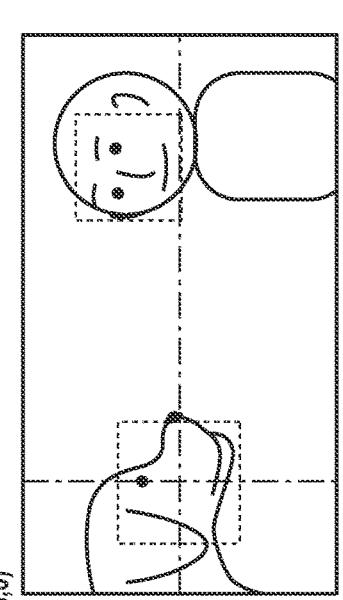

SHOOTING CONTROL APPARATUS, IMAGE CAPTURE APPARATUS, AND SHOOTING CONTROL METHOD

BACKGROUND OF THE INVENTION

Field of the Invention

The present invention relates to a shooting control apparatus that controls an imaging unit driven by an actuator, and an image capture apparatus including such an imaging control apparatus.

Description of the Related Art

Cameras that are capable of automatically and continuously capturing images at regular intervals have been known in recent years. Examples thereof include a camera that detects an object in a field of view, recognizes facial expressions and motions of the object, and automatically captures images of the object. For such cameras, settings to satisfy conditions for enabling automatic shooting entails troublesome operations, such as adjusting a camera position and zoom magnification so that an object to have a size enough for recognizing facial expressions and motions as well as the object to be near the center of the field of view.

To solve the foregoing issue, Japanese Patent Laid-Open No. 2013-247508 discusses a technique for attaching a camera to a camera platform capable of pan and tilt driving, and performing pan, tilt, and zoom driving so that a specific object in the field of view has a size and position registered in advance.

The conventional technique discussed in Japanese Patent Laid-Open No. 2013-247508 can make appropriate adjustments for the object detected in the field of view, whereas no consideration is given to other objects lying outside the field of view.

SUMMARY OF THE INVENTION

The present invention is directed to providing a shooting control apparatus, an image capture apparatus, and a shooting control method for at least alleviating such an issue related to the conventional technique.

According to an aspect of the present invention, there is provided a shooting control apparatus comprising one or more processors and/or circuitry which function as: an object detection unit configured to obtain image data from an imaging unit that obtains the image data based on light from an imaging optical system, and detect an object from the image data; and a control unit configured to control rotational driving of the imaging unit and a zoom mechanism included in the imaging optical system based on a result of detection of the object performed by the object detection unit, wherein the control unit determines a target zoom position and a shooting direction of the imaging unit so that the object falls within a partial region of a field of view of the imaging unit including a center of the field of view, based on a size and position of the object, and controls the rotational driving of the imaging unit and the zoom mechanism based on the target zoom position and the shooting direction.

According to another aspect of the present invention, there is provided an image capture apparatus comprising: an imaging unit; and a rotation mechanism for performing at least one of pan driving and tilt driving by rotating the imaging unit about at least one or more axes, the shooting control apparatus according to the present invention; wherein the control unit of the shooting apparatus controls the shooting direction by controlling the rotation mechanism.

According to a further aspect of the present invention, there is provided an shooting control method comprising: obtaining image data from an imaging unit including an image sensor configured to obtain the image data based on light from an imaging optical system; detecting an object from the image data; and controlling a shooting direction of the imaging unit and a zoom position of the imaging optical system by controlling rotational driving of the imaging unit and a zoom mechanism included in the imaging optical system, wherein the controlling includes determining a target zoom position and the shooting direction of the imaging unit so that the object falls within a partial region of a field of view of the imaging unit including a center of the field of view, based on a size and position of the object, and controlling the rotational driving and the zoom mechanism based on the target zoom position and the shooting direction.

Further features of the present invention will become apparent from the following description of exemplary embodiments with reference to the attached drawings.

BRIEF DESCRIPTION OF THE DRAWINGS

FIG. 3A is a diagram illustrating an example of image data according to the first exemplary embodiment.

FIG. 3B is a chart illustrating an example of object information according to the first exemplary embodiment.

FIG. 5 is a flowchart for describing composition determination processing according to the first exemplary embodiment.

FIG. 6 is a flowchart for describing target object determination processing according to the first exemplary embodiment.

FIG. 7 is a flowchart for describing shooting direction determination processing according to the first exemplary embodiment.

FIG. 9A is a diagram illustrating an example of image data on an object facing forward according to the first exemplary embodiment.

FIG. 9B is a chart illustrating an example of object information about the object facing forward according to the first exemplary embodiment.

FIG. 9C is a diagram illustrating comparison between a face position of the object facing forward and a target face position according to the first exemplary embodiment.

FIG. 9D is a chart illustrating the obtained pan and tilt movement amounts for the object facing forward according to the first exemplary embodiment.

FIG. 9E is a diagram illustrating an example of target composition for the object facing forward according to the first exemplary embodiment.

FIG. 10A is a diagram illustrating an example of image data on an object facing to the right according to the first exemplary embodiment.

FIG. 10B is a chart illustrating an example of object information about the object facing to the right according to the first exemplary embodiment.

FIG. 10C is a diagram illustrating comparison between the face position of the object facing to the right and a target face position according to the first exemplary embodiment.

FIG. 10D is a chart illustrating the obtained pan and tilt movement amounts for the object facing to the right according to the first exemplary embodiment.

FIG. 10E is a diagram illustrating an example of the target composition for the object facing to the right according to the first exemplary embodiment.

FIG. 10F is a diagram illustrating an example of image data obtained by moving a lens barrel in pan and tilt directions to achieve the target composition for the object facing to the right according to the first exemplary embodiment.

FIG. 11A is a diagram illustrating an example of image data on an object facing to the left according to the first exemplary embodiment.

FIG. 11B is a chart illustrating an example of object information about the object facing to the left according to the first exemplary embodiment.

FIG. 11C is a diagram illustrating comparison between the face position of the object facing to the left and a target face position according to the first exemplary embodiment.

FIG. 11D is a chart illustrating the obtained pan and tilt movement amounts for the object facing to the left according to the first exemplary embodiment.

FIG. 11E is a diagram illustrating an example of the target composition for the object facing to the left according to the first exemplary embodiment.

FIG. 11F is a diagram illustrating an example of image data obtained by moving the lens barrel in the pan and tilt directions to achieve the target composition for the object facing to the left according to the first exemplary embodiment.

FIG. 12A is a diagram illustrating an example of image data on a plurality of objects facing forward according to the first exemplary embodiment.

FIG. 12B is a chart illustrating the obtained pan and tilt movement amounts for the plurality of objects facing forward according to the first exemplary embodiment.

FIG. 12C is a diagram illustrating an example of the target composition for the plurality of objects facing forward according to the first exemplary embodiment.

FIG. 13A is a diagram illustrating an example of image data on a plurality of objects with different face orientations according to the first exemplary embodiment.

FIG. 13B is a chart illustrating the obtained pan and tilt movement amounts for the plurality of objects with different face orientations according to the first exemplary embodiment.

FIG. 13C is a diagram illustrating an example of the target composition for the plurality of objects with different face orientations according to the first exemplary embodiment.

FIG. 13D is a diagram illustrating an example of image data obtained by moving the lens barrel in the pan and tilt directions to achieve the target composition for the plurality of objects with different face orientations according to the first exemplary embodiment.

FIG. 14 is a chart illustrating a relationship between a zoom position and a relative angle of view according to the first exemplary embodiment.

FIG. 16 is a chart illustrating composition patterns according to the first exemplary embodiment.

FIG. 18A is a diagram illustrating an example of image data on an object facing forward according to the first exemplary embodiment.

FIG. 18B is a chart illustrating the obtained target zoom position for the object facing forward according to the first exemplary embodiment.

FIG. 18C is a diagram illustrating an example of the target composition for the object facing forward according to the first exemplary embodiment.

FIG. 19A is a diagram illustrating an example of image data on a plurality of objects facing forward according to the first exemplary embodiment.

FIG. 19B is a chart illustrating the obtained target zoom position for the plurality of objects facing forward according to the first exemplary embodiment.

FIG. 19C is a diagram illustrating an example of the target composition for the plurality of objects facing forward according to the first exemplary embodiment.

FIG. 20A is a diagram illustrating another example of image data on a plurality of objects facing forward according to the first exemplary embodiment.

FIG. 20B is a chart illustrating the target zoom position obtained based on the sizes of the objects and the size of an object region according to the first exemplary embodiment.

FIG. 20C is a diagram illustrating an example of the target composition for the plurality of objects facing forward according to the first exemplary embodiment.

FIG. 20D is a diagram illustrating an example of image data obtained by moving the zoom position to achieve the target composition for the plurality of objects facing forward according to the first exemplary embodiment.

FIG. 21 is a flowchart for describing composition determination processing according to a second exemplary embodiment.

FIG. 22A is a diagram illustrating an example of image data according to the second exemplary embodiment.

FIG. 22B is a chart illustrating calculation of a zoom position according to the second exemplary embodiment.

FIG. 22C is a diagram illustrating an example of target composition according to the second exemplary embodiment.

FIG. 22D is a diagram illustrating an example of image data obtained by moving the zoom position to achieve the target composition according to the second exemplary embodiment.

FIG. 23A is a diagram illustrating an example of image data on an object facing to the left according to a modification where an animal can be detected.

FIG. 23B is a chart illustrating an example of object information about the object facing to the left according to the modification where an animal can be detected.

FIG. 23C is a diagram illustrating comparison between the face position of the object facing to the left and a target face position according to the modification where an animal can be detected.

FIG. 23D is a chart illustrating the obtained pan and tilt movement amounts for the object facing to the left according to the modification where an animal can be detected.

FIG. 23E is a diagram illustrating an example of the target composition for the object facing to the left according to the modification where an animal can be detected.

FIG. 23F is a diagram illustrating an example of image data obtained by moving the lens barrel in the pan and tilt directions to achieve the target composition for the object facing to the left according to the modification where an animal can be detected.

DESCRIPTION OF THE EMBODIMENTS

As described above, the conventional technique discussed in Japanese Patent Laid-Open No. 2013-247508 does not take into account other objects lying outside the field of view.

If, for example, an object in the field of view is talking with another object outside the field of view or if a plurality of objects lines up both inside and outside the field of view, the object(s) lying outside the field of view can fail to be detected.

As a result, an object or objects to be imaged lying outside the field of view can be missed. Another possible result is that an object lying near a border of the field of view is captured with part of the object missing.

In view of this, in the following exemplary embodiments, there is described a shooting control apparatus that can reduce a chance of missing an object or objects lying outside the field of view at a point in time by taking into account a possibility that there is an object or objects supposed to be imaged outside the field of view.

The exemplary embodiments of the present invention will be described in detail below with reference to the accompanying drawings.

First Exemplary Embodiment

A first exemplary embodiment describes an example where a shooting direction is controlled based on a direction in which a detected object is facing. A shooting control apparatus according to the present exemplary embodiment controls the shooting direction so that the object falls within a field of view and, if the object is facing sideways, a captured image is wider on a side to which the object is facing than on a side to which the object is not facing. Since a target object (i.e., an object should be captured) is more likely to be found in front in the direction in which the detected object is facing than not, controlling the shooting direction in such a manner can reduce a possibility of missing an undetected object outside the field of view.

The image capture apparatus according to the present exemplary embodiment will be described.

Figure 1A:
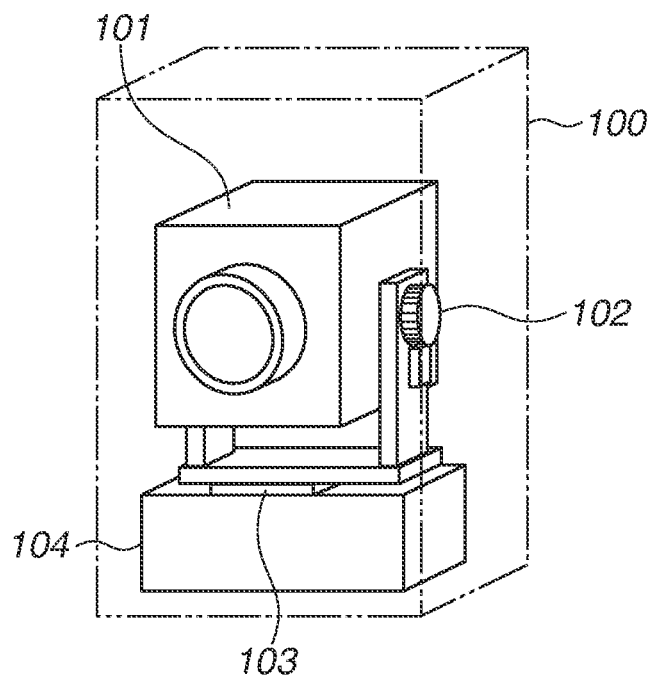
FIG. 1A is a schematic diagram illustrating an image capture apparatus according to a first exemplary embodiment.

FIG. 1A is a schematic diagram illustrating an image capture apparatus 100 according to the present exemplary embodiment.

The image capture apparatus 100 includes a lens barrel 101, a tilt rotation unit 102, a pan rotation unit 103, and a control box 104. The tilt rotation unit 102 drives the lens barrel 101 in a tilt direction. The pan rotation unit 103 drives the lens barrel 101 in a pan direction. The control box 104 controls imaging by the lens barrel 101.

The lens barrel 101 is an imaging unit including an imaging optical system for capturing an image and an image sensor for obtaining image data based on light from the imaging optical system. The lens barrel 101 is attached to the image capture apparatus 100 via a rotation mechanism that can be driven to rotate with respect to a fixed part (not illustrated) of the image capture apparatus 100.

Figure 1B:
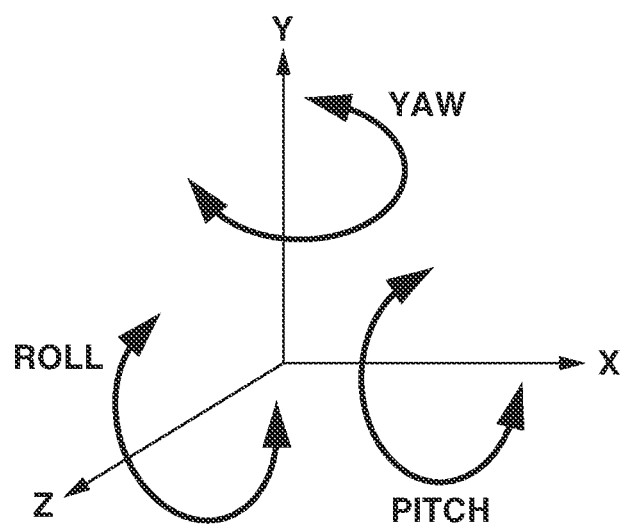
FIG. 1B is a schematic diagram illustrating rotation directions of the image capture apparatus according to the first exemplary embodiment.

To enable rotation of the lens barrel 101 in a pitch direction illustrated in FIG. 1B, the tilt rotation unit 102 includes a motor serving as an actuator, and a rotation mechanism (motor drive mechanism) driven to rotate by the motor. The pan rotation unit 103 includes a motor serving as an actuator that can rotate the lens barrel 101 in a yaw direction illustrated in FIG. 1B, and a rotation mechanism (motor drive mechanism) driven to rotate by the motor. As illustrated in FIG. 1B, the rotation of the image capture apparatus 100 about a horizontal axis (X-axis) will be referred to as pitch, the rotation about a vertical axis (Y-axis) will be referred to as yaw, and the rotation about an axis in a depth direction (Z-axis) will be referred to as roll.

The control box 104 includes a control microcomputer for controlling an imaging lens group included in the lens barrel 101, the tilt rotation unit 102, and the pan rotation unit 103. In the present exemplary embodiment, the control box 104 is located in the fixed part of the image capture apparatus 100. The control box 104 remains stationary even if the lens barrel 101 is driven to pan and tilt.

Details of processing by the control box 104 will be described with reference to FIG. 2.

Figure 2:
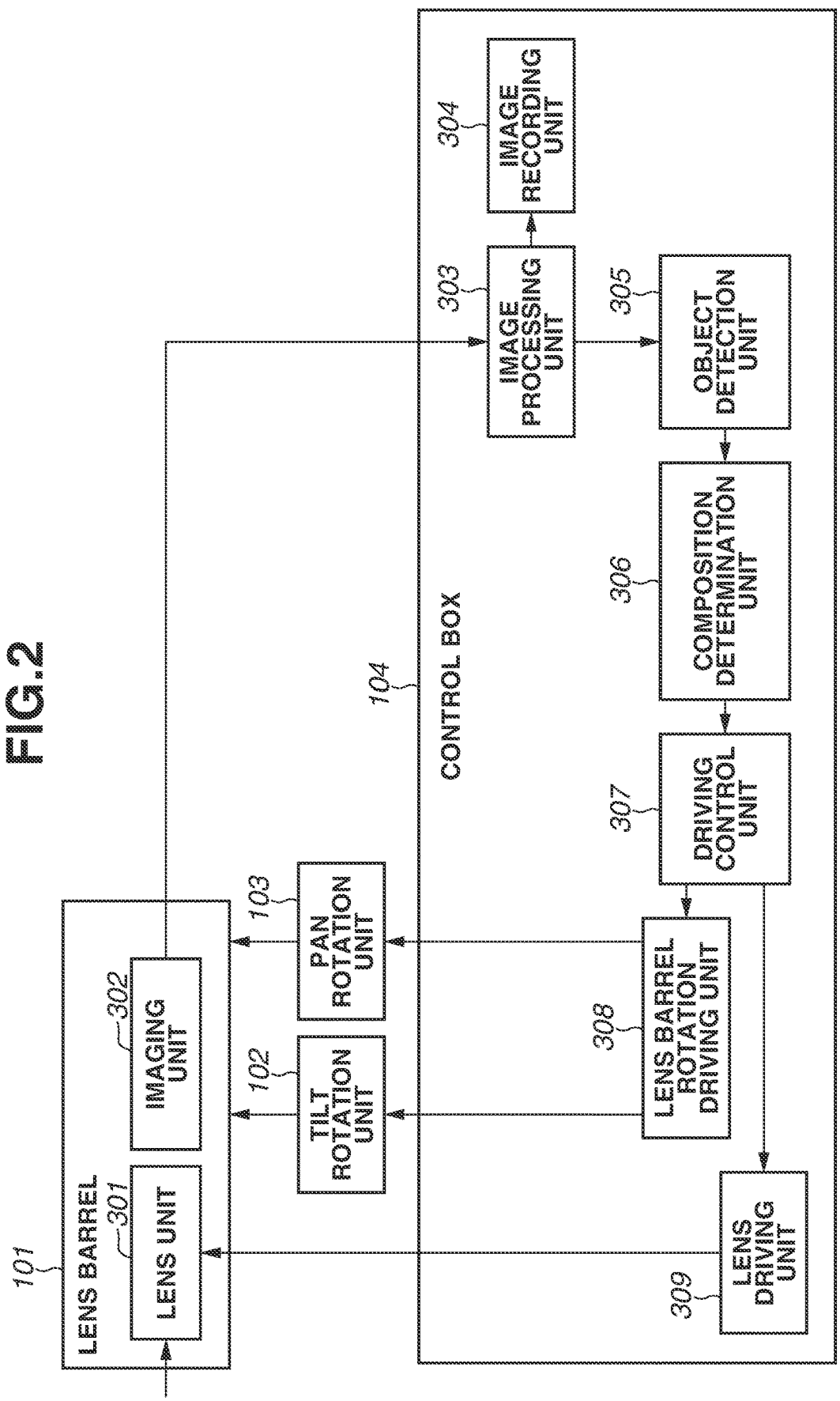
FIG. 2 is a block diagram illustrating a configuration of the image capture apparatus according to the first exemplary embodiment.

FIG. 2 is a block diagram illustrating a configuration of the image capture apparatus 100 according to the first exemplary embodiment, including the lens barrel 101, the tilt rotation unit 102, the pan rotation unit 103, and the control box 104.

The lens barrel 101 includes a lens unit 301 constituting the imaging optical system, and an imaging unit 302 including the image sensor. The lens barrel 101 is controlled and driven to rotate in the tilt and pan directions by the tilt rotation unit 102 and the pan rotation unit 103.

The lens unit 301 constituting the imaging optical system includes a zoom lens to perform zooming and a focus lens to perform focus adjustment. The lens unit 301 is driven and controlled by a lens driving unit 309. The zoom lens and the lens driving unit 309 driving the zoom lens constitute a zoom mechanism. The lens driving unit 309 moves the zoom lens in an optical axis direction, whereby a zoom function is implemented.

The imaging unit 302 including the image sensor receives light incident via the imaging lens group constituting the lens unit 301, and outputs information about charges corresponding to the amount of light to an image processing unit 303 as digital image data.

The tilt rotation unit 102 includes the motor drive mechanism rotatable in the pitch direction. The pan rotation unit 103 includes the motor drive mechanism rotatable in the yaw direction. The tilt and pan rotation units 102 and 103 drive the lens barrel 101 to rotate based on driving instructions input from a lens barrel rotation driving unit 308.

The control box 104 includes the image processing unit 303, an image recording unit 304, an object detection unit 305, a composition determination unit 306, a driving control unit 307, the lens barrel rotation driving unit 308, and the lens driving unit 309. The shooting direction of the image capture apparatus 100 is controlled by the composition determination unit 306, the driving control unit 307, and the lens barrel rotation driving unit 308. Details of each of the units will be described.

The image processing unit 303 obtains the digital image data output from the imaging unit 302. The image processing unit 303 applies image processing such as distortion correction, white balance adjustment, and color interpolation processing to the digital image data, and outputs the digital image data to which the image processing is applied to the image recording unit 304 and the object detection unit 305.

The image recording unit 304 converts a format of the digital image data output from the image processing unit 303 into a recording format such as a Joint Photographic Experts Group (JPEG) format, and records the resulting data in a recording medium such as a nonvolatile memory (not illustrated).

The object detection unit 305 detects an object or objects from the digital image data input from the image processing unit 303, and extracts information about the detected object(s). In the present exemplary embodiment, an example where the object detection unit 305 detects a human face or faces as the object(s) will be described. Examples of the information about the object(s) include the number of objects detected, and, for each object, presence or absence of face registration, a face position, a face size, and a face orientation. The object detection unit 305 outputs object information based on a detection result of each of the objects to the composition determination unit 306. Details of the object information will be described below with reference to FIGS. 3A and 3B.

The composition determination unit 306 determines a desirable composition based on the object information input from the object detection unit 305. The composition determination unit 306 further obtains a pan driving angle dp, a tilt driving angle dt, and a target zoom position tzp for achieving the determined composition, and outputs the pan driving angle dp, the tilt driving angle dt, and the target zoom position tzp to the driving control unit 307. As will be described in detail below, in the present exemplary embodiment, processing from object detection to field of view adjustment is repeated at predetermined periods. Thus, the pan driving angle dp and the tilt driving angle dt according to the present exemplary embodiment refer to a driving angle in the pan direction and a driving angle in the tilt direction in which the lens barrel 101 is driven by the driving timing of the next period. The period is a period of imaging by the imaging unit 302, during which the composition determination unit 306 performs composition determination processing based on image data obtained in each frame. The composition is thereby adjusted so that image data to be obtained in the next frame approaches the target composition, compared to the image data obtained in the previous frame. Details of the composition determination processing performed by the composition determination unit 306 will be described below.

The driving control unit 307 determines target positions for performing lens driving and rotational driving of the lens barrel 101 based on the pan driving angle dp, the tilt driving angle dt, and the target zoom position tzp input from the composition determination unit 306. The driving control unit 307 outputs a parameter based on the target zoom position tzp to the lens driving unit 309, and parameters corresponding to the target positions based on the pan driving angle dp and the tilt driving angle dt to the lens barrel rotation driving unit 308.

The lens barrel rotation driving unit 308 outputs driving instructions to the tilt rotation unit 102 and the pan rotation unit 103 based on the target positions and driving speeds input from the driving control unit 307, whereby the lens barrel 101 is driven in the tilt and pan directions.

The lens driving unit 309 includes motors and driver units for driving the zoom lens and the focus lens included in the lens unit 301. The lens driving unit 309 drives the lenses based on the target positions input from the driving control unit 307.

FIGS. 3A and 3B are diagrams illustrating an example of image data according to the present exemplary embodiment and an example of object information obtained by the object detection unit 305. A configuration of the object information will be described below.

FIG. 3A is a diagram illustrating the example of image data input to the object detection unit 305. In the present exemplary embodiment, the image data has a horizontal resolution of 960 pixels and a vertical resolution of 540 pixels.

FIG. 3B is a chart illustrating the example of object information extracted by inputting the image data illustrated in FIG. 3A into the object detection unit 305. In the present exemplary embodiment, an example where the object information includes the number of objects, and, for each object, presence or absence of face registration, a face size, a face position, and a face orientation will be described.

The number of objects indicates the number of faces detected. In the example of FIG. 3B, the number of objects is four, which indicates that the presence or absence of face registration, face sizes, face positions, and face orientations of four objects are included in the object information. The detected objects are arranged in order of closeness of the face position to the center of the field of view. An object 1 is the closest to the center, and an object 4 is the farthest from the center.

The presence or absence of face registration is information indicating whether a face is registered in advance by the user. An object having a face registered is indicated as true, and an object having a face not registered is indicated as false. The user can store faces to be preferentially imaged during automatic shooting in the image capture apparatus 100 by capturing images of specific persons' faces and registering the faces in advance. A detailed description of a registration method will be omitted herein. For example, the user shifts the image capture apparatus 100 to a special mode and manually captures images for registration. Alternatively, face image data input from an external device by a communication unit may be registered. The image capture apparatus 100 may automatically register faces frequently detected. Any of such methods may be used.

A face size (w, h) includes numerical values indicating the size of the detected face. The numbers of pixels of the width (w) and the height (h) of the face are input as the face size (w, h). In the present exemplary embodiment, the width and the height have the same value.

A face position (x, y) includes numerical values indicating a relative position of the detected face within the field of view. In the present exemplary embodiment, the number of pixels in a horizontal direction and the number of pixels in a vertical direction from a start point to the center coordinates of the face are input as the face position (x, y), with the top left of the image data as the start point (0, 0) and the bottom right of the screen as an end point (960, 540).

A face orientation is information indicating the direction the detected face faces. Any one of pieces of information including Front (facing forward), R45 (facing 45° to the right), R90 (facing 90° to the right), L45 (facing 45° to the left), and L90 (facing 90° to the left) is input as the face orientation.

Figure 4:
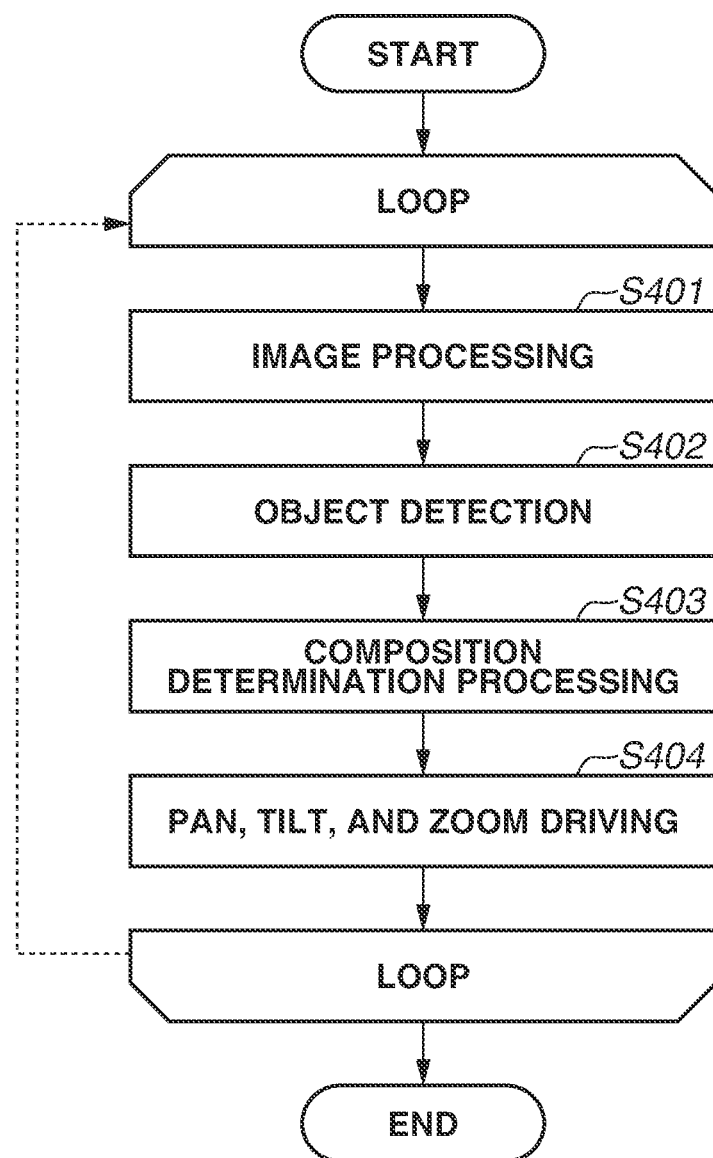
FIG. 4 is a flowchart for describing composition adjustment processing of the image capture apparatus according to the first exemplary embodiment.

FIG. 4 is a flowchart illustrating an entire procedure for adjusting the field of view (composition) according to the present exemplary embodiment. The composition is defined by the shooting direction defined by the pan and tilt positions, and a zoom magnification (zoom position). When the image capture apparatus 100 is powered on, the imaging unit 302 of the image capture apparatus 100 starts periodic imaging (moving image capturing) to obtain image data for use in determining whether to adjust the composition. In step S401, the image data obtained by the imaging is output to the image processing unit 303 of the control box 104, whereby image data to which various types of image processing are applied is obtained. The image data is intended for composition adjustment. Thus, the image data obtained in step S401 is output not to the image recording unit 304 but to the object detection unit 305. In other words, the image data obtained here corresponds to image data for a live view display in an image capture apparatus with which the user adjusts composition and makes a shutter operation to capture an image. The periodic imaging for obtaining the image data corresponds to live view imaging. In the present exemplary embodiment, the image data is only used by the control box 104 to adjust composition and determine automatic shooting timing, and not to display an image. In step S402, the object detection unit 305 performs object detection based on the image data, and obtains object information as illustrated in FIG. 3B.

In step S403, after an object or objects are detected and object information thereof is obtained, the composition determination unit 306 performs composition determination processing. In the composition determination processing, the composition determination unit 306 determines an object or objects to be imaged (i.e., one or more target objects) from among the detected objects, and obtains the pan driving angle dp and the tilt driving angle dt in which the lens barrel 101 is to be driven by the driving timing of the next period (step S404) based on the face position(s), face size(s), and face orientation(s) of the object(s) to be imaged. The composition determination unit 306 also obtains the target zoom position tzp based on the face position(s) and face size(s). Details of the processing will be described below with reference to FIG. 5. In step S404, with the pan driving angle dp, the tilt driving angle dt, and the target zoom position tzp obtained through the composition determination processing, the composition is adjusted by performing pan driving, tilt driving, and zoom driving based on the information. Such steps S401 to S404 are repeated in synchronization with an imaging period of the imaging unit 302.

Details of the composition determination processing illustrated in step S403 will be described.

FIG. 5 is a flowchart that describes the composition determination processing performed by the composition determination unit 306 according to the present exemplary embodiment. Processing for determining target composition and calculating the pan driving angle dp, the tilt driving angle dt, and the target zoom position tzp from the object information input to the composition determination unit 306 will be described with reference to the flowchart. In step S501, the composition determination unit 306 performs target object determination processing to determine whether the detected object(s) is/are an object or objects to be imaged (may be referred to as a target object or objects) that are to be included in the field of view. The target object determination processing is performed based on the presence or absence of face registration, face size(s), and face position(s) included in the input object information. A face-registered object or objects and/or an object or objects having a similar size and position to those of the face-registered object are selected as target objects. Details of the target object determination processing will be described below with reference to FIG. 6.

In step S502, after the end of the target object determination processing, the composition determination unit 306 determines whether the number of target objects is one or more. If the number of target objects is determined to be one or more (YES in step S502), the processing proceeds to step S503. If the number of target objects is determined to be zero (NO in step S502), the composition determination unit 306 determines to not adjust the composition, and the composition determination processing ends.

In step S503, i.e., if the number of target objects is one or more, the composition determination unit 306 determines the shooting direction of the imaging unit 302 and obtains a pan movement amount dx and a tilt movement amount dy based on the object information about the object(s) determined to be the target object(s) in step S501. The face position(s) and the face orientation(s) are used as the object information about the target object(s). The pan movement amount dx is a numerical value expressing a difference between a target horizontal coordinate and a current horizontal coordinate of a target object in the image data in terms of the number of pixels. The tilt movement amount dy is a numerical value expressing a difference between a target vertical coordinate and a current vertical coordinate of the target object in the image data in terms of the number of pixels. Details of the processing for obtaining the pan and tilt movement amounts dx and dy will be described below with reference to FIGS. 7 to 13D.

With the pan and tilt movement amounts dx and dy obtained in step S503, then in step S504, the composition determination unit 306 calculates the pan driving angle dp and the tilt driving angle dt based on the obtained pan and tilt movement amounts dx and dy and a current zoom position zp. The processing for obtaining the pan and tilt driving angles dp and dt will be described below with reference to FIG. 15.

With the pan and tilt driving angles dp and dt obtained in step S504, then in step S505, the composition determination unit 306 obtains the target zoom position tzp based on the object information about the target object(s) and the current zoom position zp. The face position(s) and the face size(s) are used as the object information about the target object(s). The processing for obtaining the target zoom position tzp will be described below with reference to FIGS. 16 to 20D.

FIG. 6 is a flowchart for describing the target object determination processing performed by the composition determination unit 306 according to the present exemplary embodiment in step S501.

If the object information is input, then in step S601, first, the composition determination unit 306 determines whether the object is face-registered. If the object is face-registered (YES in step S601), the processing proceeds to step S602. In step S602, the composition determination unit 306 determines the object to be a target object (adds the object as a target object). If the object is not face-registered (NO in step S601), the processing skips step S602.

Through such processing, a face-registered object is preferentially determined to be a target object. The composition determination unit 306 performs the processing of steps S601 to S602 on all the detected objects.

In step S603, the composition determination unit 306 refers to the number of objects determined to be target objects through the foregoing processing and determines whether the number of target objects is one or more. If the number of target objects is zero (NO in step S603), the processing proceeds to step S604. In step S604, the composition determination unit 306 adds the object 1 closest to the center of the field of view in the image data as a target object. If the number of target objects is one or more (YES in step S603), the processing skips step S604. This enables determination of target objects with reference to the object closest to the center of the field of view in a case where there is no face-registered object.

Next, the composition determination unit 306 performs the processing of steps S605 to S608 on each of all the objects in order from the object 1 closest to the center of the field of view, thereby determining whether to add the object as a target object. In step S605, first, the composition determination unit 306 refers to whether the object to be determined is already determined to be a target object. If the object to be determined is already determined to be the target object (YES in step S605), the processing skips steps S606 to S608. If the object to be determined is not determined to be a target object yet (NO in step S605), the processing proceeds to step S606. Next, in step S606, the composition determination unit 306 determines whether the object to be determined has a face size similar to that of any target object already added. If the object is determined to not have the face size similar to that of any target object (NO in step S606), the processing skips steps S607 and S608, and step S605 is started with the next object as an object to be determined. On the other hand, if the object is determined as having the face size similar to that of any target object (YES in step S606), the processing proceeds to step S607. In step S607, the composition determination unit 306 determines whether the object to be determined is located close to any target object already added. If the object is determined to not be located close to any target object (NO in step S607), the processing skips step S608, and step S605 is started with the next object as an object to be determined. On the other hand, if the object is determined to be located close to any target object (YES in step S607), the processing proceeds to step S608. The determination about the face size is made based on whether the face size falls within ±10% of the face size of any object determined to be a target object. More specifically, if the target object has a face size of 100 pixels and the object to be determined has a face size of 90 pixels or more and 110 pixels or less, the object is determined as having a similar size. The determination about the position is made based on whether the object to be determined is located within twice the face size of any object determined to be a target object from the face position of the target object in both the horizontal and vertical directions. More specifically, in a case where a target object has a face size of (100, 100) and a face position of (500, 300), if the object to be determined has a face position satisfying both a horizontal coordinate of 300 to 700 and a vertical coordinate of 100 to 500, the object is determined to be located close to the target object.

In step S608, the composition determination unit 306 adds the object determined as having a similar size and position to those of any target object in steps S606 and S607 as a target object.

Through the processing of steps S601 to S608, an object or objects to be imaged that are to be included within the field of view can be determined from the input object information.

In the present exemplary embodiment, the target object(s) is/are determined based on the presence or absence of face registration, similarity in face size, and closeness in face position. However, the determination method is not limited thereto. For example, a method for determining a target object or objects using fewer pieces of information, such as by referring only to the presence or absence of face registration, may be used. A method for making a determination based on information such as face orientation, facial expression, and magnitude of facial motion may be used.

Target objects determined by the flowchart of FIG. 6 when the object information illustrated in FIG. 3B is input to the composition determination unit 306 will be described. If the object information illustrated in FIG. 3B is input to the composition determination unit 306, only the face-registered object 1 is determined to be a target object in the processing of steps S601 and S602 in FIG. 6. In step S603 of FIG. 6, the number of target objects is one, and the processing of step S604 is skipped. In the processing of steps S605 to S608 in FIG. 6, the composition determination unit 306 determines similarity in size and closeness in position to the target object. In step S606, since the object 1 has a face size of 120, objects 2 and 3 each having a face size falling within the range of 108 to 132 are determined as having similar face sizes to that of the target object. The object 4 is excluded from target object candidates. In step S607, since the object 1 has a face position of (480, 210), the objects 2 and 3 each satisfying a condition that the horizontal coordinate of the face position is 240 to 720 and the vertical coordinate is 90 to 330 are determined to be located close to the target object.

Through the foregoing processing, the object 1 that is face-registered and the objects 2 and 3 that each have a similar size and position to those of the object 1 are determined to be target objects.

Next, the processing for obtaining the pan and tilt movement amounts dx and dy in step S503 will be described. In step S503, where the number of target objects is n, the composition determination unit 306 calculates differences dx(n) and dy(n) from a target face position based on the face position and face orientation of each of the target objects. Then, the composition determination unit 306 calculates averages of dx(n) and dy(n) as the pan and tilt movement amounts dx and dy, respectively.

FIG. 7 is a flowchart for describing the processing for obtaining the pan and tilt movement amounts dx and dy performed by the composition determination unit 306 according to the present exemplary embodiment in step S503. Which of the detected object(s) to select as a target object is determined in step S501, and after the selection of the target object(s), the processing proceeds to step S503. In step S503, the composition determination unit 306 starts step S701 of FIG. 7. In step S701, the composition determination unit 306 obtains the information about the face position(s) and face orientation(s) of the target object(s). If the object information illustrated in FIG. 3B is input, the target objects are the objects 1 to 3. Thus, the composition determination unit 306 obtains at least the information about the face positions and face orientations from the object information about the objects 1 to 3. The information indicating the presence or absence of face registration, face sizes, face positions, and face orientations, i.e., all the object information corresponding to the objects 1 to 3 among the information illustrated in FIG. 3B may be obtained.

Then, the composition determination unit 306 performs the processing of steps S702 and S703 on each of all the target objects to obtain the differences dx(n) and dy(n) between the current face position and the target face position of each of the target objects. In step S702, first, the composition determination unit 306 obtains a target face position based on the face orientation of the target object for which the differences are obtained. In the present exemplary embodiment, target face positions corresponding to respective face orientations are determined in advance and stored in a not-illustrated memory of the control box 104.

In the present exemplary embodiment, the differences dx(n) and dy(n) of the target objects from the respective target face positions are averaged to calculate the target position. However, the calculation method is not limited thereto. For example, a face detection accuracy of each of the target objects may be obtained, and weights may be assigned to the differences dx(n) and dy(n) from the target face positions based on the face detection accuracy. Using such a method, the target position may be calculated to provide composition suitable for objects having higher detection accuracy.

Figure 8A:
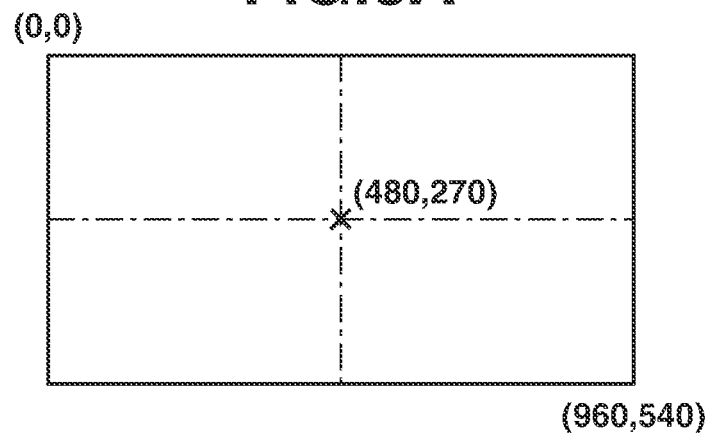
FIG. 8A is a diagram illustrating a target face position in calculating a pan movement amount and a tilt movement amount according to the first exemplary embodiment.
Figure 8B:
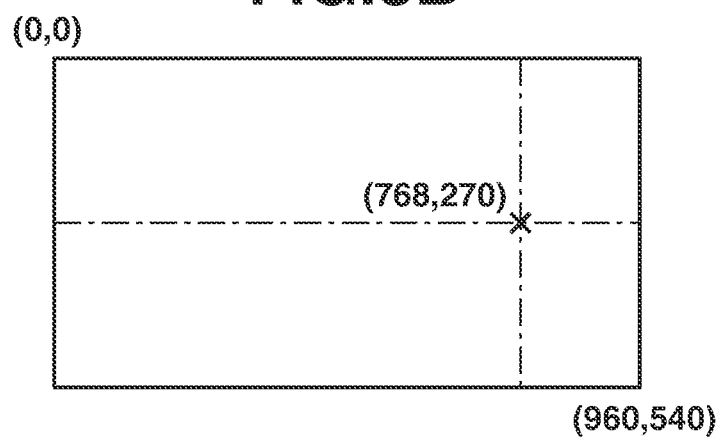
FIG. 8B is a diagram illustrating a target face position in calculating the pan and tilt movement amounts according to the first exemplary embodiment.
Figure 8C:
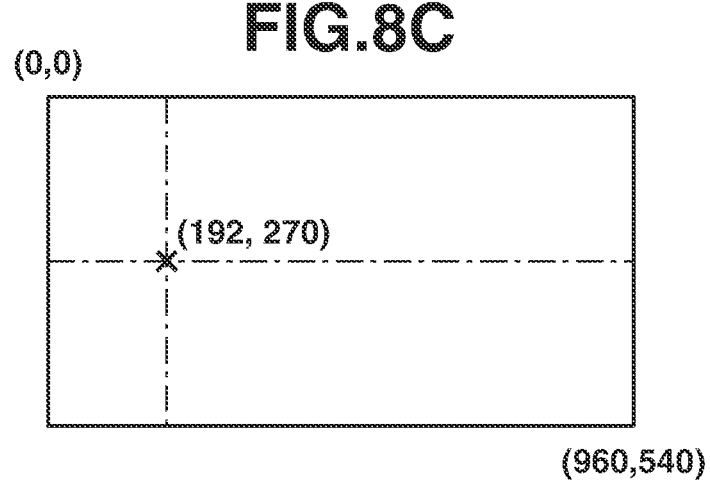
FIG. 8C is a diagram illustrating a target face position in calculating the pan and tilt movement amounts according to the first exemplary embodiment.

FIGS. 8A to 8C are diagrams for describing predetermined target face positions. FIG. 8A is a diagram illustrating a target face position for an object facing forward (Front). In a case where the face orientation is Front, the target face position is located at the center coordinates of the field of view, i.e., (480, 270).

FIG. 8B is a diagram illustrating a target face position for an object facing to the right (to the left as seen from the imaging optical system, i.e., to the left in the image data) (R45, R90). In a case where the object faces to the right, the target face position is set closer to the right edge of the field of view compared to when the object faces forward. The target face position is thereby determined to leave a large blank space in the left part of the field of view (on the right of the object). In this example, the target face position is located vertically at the center of the field of view and horizontally at a coordinate corresponding to four-fifths of the field of view, i.e., (768, 270).

FIG. 8C is a diagram illustrating a target face position for an object facing to the left (to the right as seen from the imaging optical system, i.e., to the right in the image data) (L45, L90). In a case where the object faces to the left, the target face position is set closer to the left edge of the field of view compared to when the object faces forward. The target face position is thereby determined to leave a large blank space in the right part of the field of view (on the left of the object). In this example, the target face position is located vertically at the center of the field of view and horizontally at a coordinate corresponding to one-fifth of the field of view, i.e., (192, 270).

As illustrated in FIGS. 8B and 8C, the composition is adjusted to increase the blank space in the direction the face of the target object faces. This facilitates recognition of an object being in front in the direction the face faces. Specific advantages will be described with reference to FIGS. 10A to 11F.

In step S703, after the target face position is obtained, the composition determination unit 306 obtains the differences dx(n) and dy(n) between the current face position and the target face position. If the differences dx(n) and dy(n) of all the target objects have been obtained, the processing proceeds to step S704. In step S704, the composition determination unit 306 obtains an average of the horizontal differences dx(n) as the pan movement amount dx and an average of the vertical differences dy(n) as the tilt movement amount dy.

FIGS. 9A to 13D are diagrams and charts for describing specific examples of the object information about a target object or objects and the obtained pan and tilt movement amounts dx and dy according to the present exemplary embodiment.

FIG. 9A is a diagram illustrating an example of image data input to the object detection unit 305 in a case where there is only one object facing forward. FIG. 9B is a chart illustrating the object information about the target object corresponding to the image data of FIG. 9A. The object information illustrated here is obtained in the foregoing step S701. Since the face orientation of the object 1 is Front, the target face position obtained in step S702 is (480, 270) as illustrated in FIG. 8A. FIG. 9C is a diagram schematically illustrating a positional relationship between the face position (240, 150) of the object 1 illustrated in FIG. 9B and the target face position (480, 270) illustrated in FIG. 8A.

FIG. 9D is a chart illustrating differences dx(1) and dy(1) (hereinafter, referred to as pan and tilt movement amounts dx(1) and dy(1), respectively) of the object 1 obtained in step S703 and the pan and tilt movement amounts dx and dy obtained and output as a final result in step S704. The pan and tilt movement amounts dx(1) and dy(1) of the object 1 are calculated by the target face position—the face position in both the horizontal and vertical directions as expressed by the following equations:

$$dx(1)=480-240=240, \text{ and}$$

$$dy(1)=270-150=120.$$

Since the number of target objects is one, averages do not need to be calculated, and the pan and tilt movement amounts dx(1) and dy(1) are simply calculated as the pan and tilt movement amounts dx and dy.

FIG. 9E is a diagram illustrating an example of target composition in a case where the lens barrel 101 is moved in the pan and tilt directions based on FIG. 9D. As illustrated in FIG. 9E, the target composition is such that the face is located at the center of the field of view since the object 1 faces forward.

FIG. 10A is a diagram illustrating an example of image data input to the object detection unit 305 in a case where there is only one object facing to the right (to the left as seen from the imaging optical system). FIG. 10B is a chart illustrating the object information about the target object corresponding to the image data of FIG. 10A. Since the face orientation of the object 1 is R90, the target face position obtained in step S702 is (768, 270) as illustrated in FIG. 8B. FIG. 10C is a diagram schematically illustrating a positional relationship between the face position (210, 180) of the object 1 illustrated in FIG. 10B and the target face position illustrated in FIG. 8B.

FIG. 10D is a chart illustrating the pan and tilt movement amounts dx(1) and dy(1) of the object 1 obtained in step S703 and the pan and tilt movement amounts dx and dy obtained and output as a final result in step S704. The pan and tilt movement amounts dx(1) and dy(1) of the object 1 are calculated by the target face position—the face position in both the horizontal and vertical directions as expressed by the following equations:

$$dx(1)=768-210=558, \text{ and}$$

$$dy(1)=270-180=90.$$

Since the number of target objects is one, averages do not need to be calculated, and the pan and tilt movement amounts dx(1) and dy(1) are simply calculated as the pan and tilt movement amounts dx and dy.

FIG. 10E is a diagram illustrating an example of the target composition in a case where the lens barrel 101 is moved in the pan and tilt directions based on FIG. 10D. As illustrated in FIG. 10E, the target composition is such that the face is located in the right part of the field of view to increase the blank space in the left part of the field of view since the object 1 faces to the right.

FIG. 10F is a diagram illustrating an example where object detection processing is performed on image data obtained after the lens barrel 101 is moved in the pan and tilt directions to move the field of view to achieve the target composition illustrated in FIG. 10E, whereby another object not detected at the time of obtaining the image data of FIG. 10A can be detected. The object on the right in FIG. 10F is the object 1, and the object on the left is the other object detected in the target composition. As illustrated in FIG. 10F, increasing the blank space in the direction that the face of the object 1 faces enables detection of another new object, for example a person who talking with the object 1, that could not be detected if the object 1 were located at the center of the field of view.

FIG. 11A is a diagram illustrating an example of image data input to the object detection unit 305 in a case where there is only one object facing to the left (to the right when seen from the imaging optical system).

FIG. 11B is a chart illustrating the object information about the target object corresponding to the image data of FIG. 11A. Since the face orientation of the object 1 is L90, the target face position obtained in step S702 is (192, 270) as illustrated in FIG. 8C.

FIG. 11C is a diagram schematically illustrating a positional relationship between the face position (690, 390) of the object 1 illustrated in FIG. 11B and the target face position (192, 270) illustrated in FIG. 8C.

FIG. 11D is a chart illustrating the pan and tilt movement amounts dx(1) and dy(1) of the object 1 obtained in step S703 and the pan and tilt movement amounts dx and dy obtained and output as a final result in step S704.

The pan and tilt movement amounts dx(1) and dy(1) of the object 1 are calculated by the target face position—the face position in both the horizontal and vertical directions as expressed by the following equations:

$$dx(1)=192-690=-498, \text{ and}$$

$$dy(1)=270-390=-120.$$

Since the number of target objects is one, averages do not need to be calculated, and the pan and tilt movement amounts dx(1) and dy(1) are simply calculated as the pan and tilt movement amounts dx and dy.

FIG. 11E is a diagram illustrating an example of the target composition in a case where the lens barrel 101 is moved in the pan and tilt directions based on FIG. 11D. As illustrated in FIG. 11E, the target composition is such that the face is located in the left part of the field of view to increase the blank space in the right part of the field of view since the object 1 faces to the left.

FIG. 11F is a diagram illustrating an example where the object detection processing is performed on image data obtained after the field of view is moved to achieve the target composition illustrated in FIG. 11E, whereby another object not detected at the time of obtaining the image data of FIG. 11A can be detected. As illustrated in FIG. 11F, increasing the blank space in front in the direction that the face of the object 1 faces enables the detection of another new object, for example, a person who talking with the object 1, that could not be detected if the object 1 were located at the center of the field of view.

FIG. 12A is a diagram illustrating an example of image data input to the object detection unit 305 in a case where there is a plurality of target objects facing forward.

FIG. 12B is a chart illustrating the differences dx(n) and dy(n) (hereinafter, referred to as pan and tilt movement amounts dx(n) and dy(n), respectively) of the target objects, and the pan and tilt movement amounts dx and dy output as a final result.

Since the face orientations of the objects 1, 2, and 3 are Front, the target face position of each of the target objects obtained in step S702 is (480, 270) as illustrated in FIG. 8A. FIG. 12B illustrates calculations of the pan and tilt movement amounts dx(n) and dy(n) of the respective target objects.

The method for calculating the pan and tilt movement amounts dx(n) and dy(n) of the target objects is similar to that of FIG. 9C. Thus, a description thereof will be omitted. Since the number of target objects is three, averages of the pan and tilt movement amounts dx(n) and dy(n) of all the target objects are calculated as the pan and tilt movement amounts dx and dy:

$$dx=(120+(-30)+330)/3=140, \text{ and}$$

$$dy=(60+90+60)/3=70.$$

FIG. 12C is a diagram illustrating an example of the target composition in a case where the lens barrel 101 is moved in the pan and tilt directions based on FIG. 12B. As illustrated in FIG. 12C, the target composition is such that all the faces are located at positions close to the center of the field of view since all the target objects face forward.

FIG. 13A is a diagram illustrating an example of image data input to the object detection unit 305 in a case where there is a plurality of target objects with different face orientations.

FIG. 13B is a chart illustrating the pan and tilt movement amounts dx(n) and dy(n) of the target objects, and the pan and tilt movement amounts dx and dy output as a final result.

Since the face orientation of the object 1 is Front, the target face position of the object 1 obtained in step S702 performed on the object 1 is (480, 270) as illustrated in FIG. 8A. Meanwhile, the face orientations of the objects 2 and 3 are R90, and thus the target face positions of the objects 2 and 3 obtained in step S702 performed on the objects 2 and 3 are (768, 270) as illustrated in FIG. 8B. FIG. 13B illustrates the calculations of the pan and tilt movement amounts dx(n) and dy(n) of the respective target objects.

The method for calculating the pan and tilt movement amounts dx(n) and dy(n) of the target objects is similar to that of FIGS. 9C and 10C. Thus, a description thereof will be omitted. Since the number of target objects is three, averages of the pan and tilt movement amounts dx(n) and dy(n) of all the target objects are calculated as the pan and tilt movement amounts dx and dy:

$$dx=((-30)+408+618)/3=332, \text{ and}$$

$$dy=(90+60+60)/3=70.$$

FIG. 13C is a diagram illustrating an example of the target composition in a case where the lens barrel 101 is moved in the pan and tilt directions based on FIG. 13B. As illustrated in FIG. 13C, the target composition is such that all the target objects are located in the right part of the field of view to increase the blank space in the left part of the field of view since there are more target objects facing to the right among all the target objects.

FIG. 13D is a diagram illustrating an example where the lens barrel 101 is moved to move the field of view to achieve the target composition illustrated in FIG. 13C, whereby another object not detected at the time of obtaining the image data of FIG. 13A can be detected. As illustrated in FIG. 13D, if there is a plurality of target objects, the blank space in front in the direction that a relative majority among the faces of all the target objects face is increased. This enables the detection of another new object that could not be detected if the target objects were located at a center area of the field of view.

FIG. 14 is a chart for describing a relationship between the zoom position zp and a relative angle of view aov(zp) according to the present exemplary embodiment. In the present exemplary embodiment, possible settings of the zoom position zp are 0 to 100. The smaller the value, the closer to the wide angle end, and the greater the value, the closer to the telephoto end. The angle of view available for imaging varies with the zoom position zp. The closer to the wide angle end, the wider the imaging angle of view, and the closer to the telephoto end, the narrower the imaging angle of view. The relative angle of view aov(zp) illustrated in FIG. 14 indicates numerical values representing relative imaging angles of view at respective zoom positions zp, with the imaging angle of view at a zoom position zp of 0 as 1000.

For example, if the zoom position zp is 100, the relative angle of view aov(100) is 500. This indicates that the imaging angle of view at the zoom position zp of 100 is 50% that at the zoom position zp of 0. The relative angle of view aov(zp) is referred to during pan driving and tilt driving. For example, in a case where an object on-screen moves horizontally by 100 pixels when the zoom position zp is 0 and the pan angle is moved by 1°, the object on-screen moves horizontally by 200 pixel in a case where the zoom position zp is 100 and the pan angle is moved by 1°.

In other words, to avoid movement by more than expected pixels at telephoto-side zoom positions, driving angles can desirably be calculated so that the object moves by the same number of pixels regardless of the imaging angle of view. The calculation method will be described with reference to FIG. 15.

Figure 15:
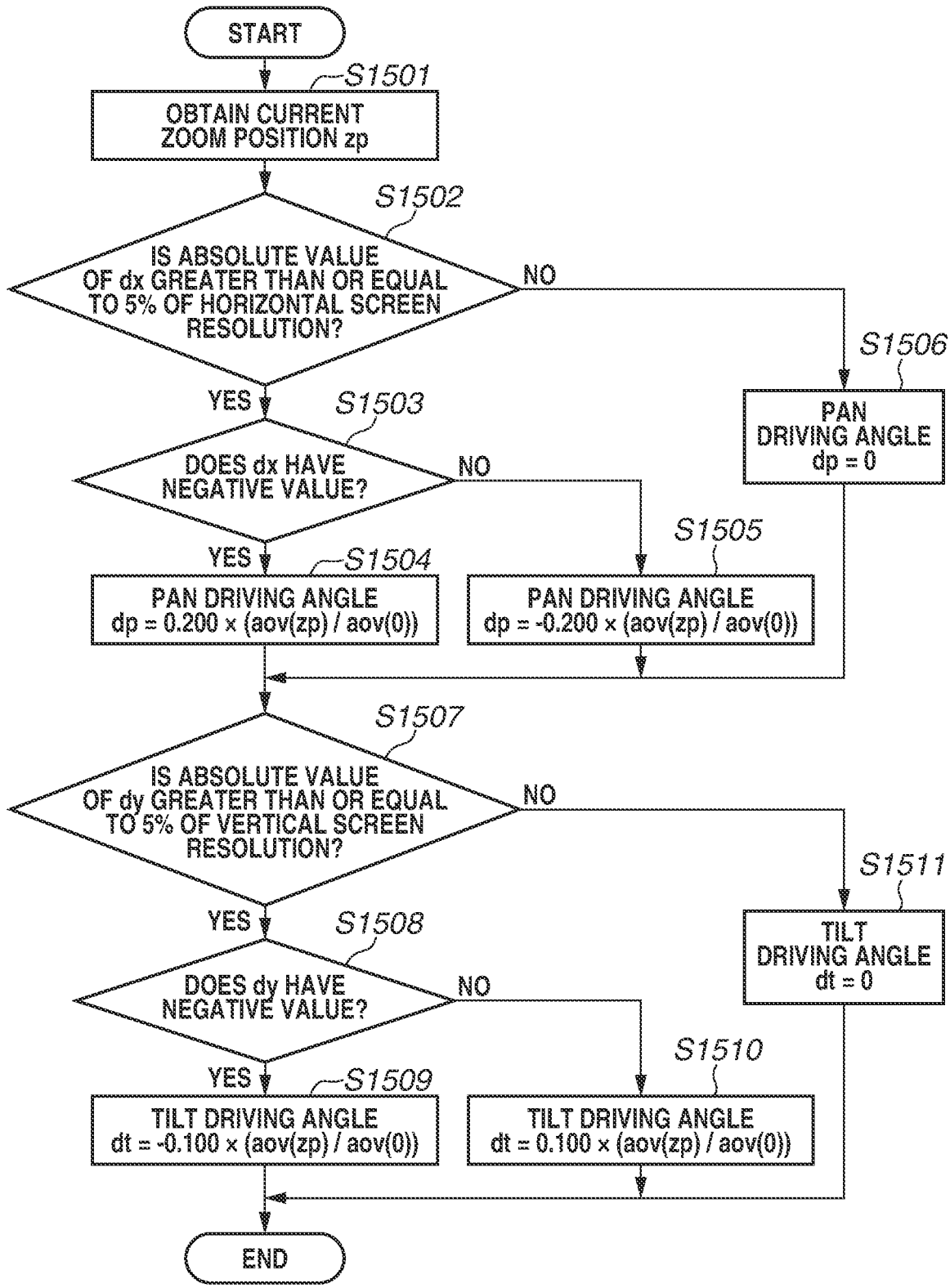
FIG. 15 is a flowchart for describing processing for obtaining a pan driving angle and a tilt driving angle according to the first exemplary embodiment.

FIG. 15 is a flowchart for describing the processing for obtaining the pan and tilt driving angles dp and dt in the foregoing step S504 performed by the composition determination unit 306 according to the present exemplary embodiment. Referring to FIG. 15, processing for calculating the pan and tilt driving angles dp and dt from the current zoom position zp and the pan and tilt movement amounts dx and dy will be described.

First, in step S1501, the composition determination unit 306 obtains the current zoom position zp. In step S1502, the composition determination unit 306 determines whether an absolute value of the pan movement amount dx is greater than or equal to 5% of a horizontal screen resolution, i.e., 48 pixels or more. If the absolute value is greater than or equal to 5% (YES in step S1502), the composition determination unit 306 determines to perform pan driving, and the processing proceeds to step S1503. On the other hand, if the absolute value is less than 5% (NO in step S1502), the composition determination unit 306 determines to not perform the pan driving since the pan movement amount dx is small, i.e., the target position is almost reached, and the processing proceeds to step S1506. In step S1506, the composition determination unit 306 obtains a pan driving angle dp of 0.

If, in step S1502, the composition determination unit 306 determines to perform the pan driving, then in step S1503, the composition determination unit 306 determines whether the pan movement amount dx has a positive value or a negative value. In the present exemplary embodiment, a positive direction of the pan driving refers to a clockwise direction about the rotation axis, and a negative direction thereof refers to a counterclockwise direction. If the pan movement amount dx has a positive value, i.e., the object(s) is/are to be moved from left to right in the field of view, the lens barrel 101 is driven in the negative pan direction. On the other hand, if the pan movement amount dx has a negative value, i.e., the object(s) is to be moved from right to left in the field of view, the lens barrel 101 is driven in the positive pan direction.

In other words, in the present exemplary embodiment, the pan movement amount dx and the pan driving angle dp have opposite signs. If the pan movement amount dx has a negative value (YES in step S1503), the processing proceeds to step S1504. If the pan movement amount dx has a positive value (NO in step S1503), the processing proceeds to step S1505.

In step S1504, i.e., if the pan movement amount dx has a negative value, the composition determination unit 306 calculates the pan driving angle dp from a unit driving angle in the positive direction (in the present exemplary embodiment, 0.200), the relative angle of view aov(zp) at the zoom position zp, and the relative angle of view aov(0) at the zoom position of 0 by using the following equation:

$$dp=0.200\times(aov(zp)/aov(0)).$$

For example, if the zoom position zp is 0:

$$dp=0.200\times(1000/1000)=0.200.$$

Thus, the pan driving angle dp is calculated to be 0.200° in the positive direction.

If the zoom position zp is 100:

$$dp=0.200\times(500/1000)=0.100.$$

Thus, the pan driving angle dp is calculated to be 0.100° in the positive direction.

In step S1505, i.e., if the pan movement amount dx has a positive value, the composition determination unit 306 similarly calculates the pan driving angle dp from a unit driving angle in the negative direction (in the present exemplary embodiment, −0.200), the relative angle of view aov(zp) at the zoom position zp, and the relative angle of view aov(0) at the zoom position of 0 by using the following equation:

$$dp=-0.200\times(aov(zp)/aov(0)).$$

As described above, the pan driving angle dp varies depending on the zoom position zp, but magnitude of pan driving is basically the same. As described with reference to FIG. 4, the composition adjustment processing is periodically performed in synchronization with the imaging period of the imaging unit 302. Thus, the pan driving angle dp calculated here represents an amount of driving between the pan and tilt driving (step S404) in the current period and the pan and tilt driving (step S404) in the next period. In other words, processing for gradually bringing a face position closer to a target position is implemented by repeating the processing of steps S401 to S404 a plurality of times. Since differences in the angle of view depending on the zoom position zp are absorbed by using the relative angles of view aov(zp) at respective zoom positions zp, pixel changes on the image data in driving the lens barrel 101 by a specific angle can be uniformized regardless of the zoom position zp.

After the pan driving angle dp is obtained in any one of steps S1504 to S1506, the composition determination unit 306 obtains the tilt driving angle dt. First, in step S1507, the composition determination unit 306 determines whether an absolute value of the tilt movement amount dy is greater than or equal to 5% of a vertical screen resolution, i.e., 27 pixels or more. If the absolute value is greater than or equal to 5% (YES in step S1507), the composition determination unit 306 determines to perform tilt driving, and the processing proceeds to step S1508. On the other hand, if the absolute value is less than 5% (NO in step S1507), the composition determination unit 306 determines to not perform the tilt driving since the tilt movement amount dy is small, i.e., the target position is almost reached, and the processing proceeds to step S1511. In step S1511, the composition determination unit 306 obtains a tilt driving angle dt of 0.

If, in step S1507, the composition determination unit 306 determines to perform the tilt driving, then in step S1508, the composition determination unit 306 determines whether the tilt movement amount dy has a positive value or a negative value. In the present exemplary embodiment, a positive direction of the tilt driving refers to an upward direction, and a negative direction thereof refers to a downward direction. If the tilt movement amount dy has a positive value, i.e., the object(s) on-screen is/are to be moved from an upper position to a lower position, the lens barrel 101 is driven in the positive tilt direction. On the other hand, if the tilt movement amount dy has a negative value, i.e., the object(s) is/are to be moved from a lower position to an upper position, the lens barrel 101 is driven in the negative tilt direction.

Unlike during pan driving, the tilt movement amount dy and the tilt driving angle dt have the same sign. If the tilt movement amount dy has a negative value (YES in step S1508), the processing proceeds to step S1509. If the tilt movement amount dy has a positive value (NO in step S1508), the processing proceeds to step S1510.

In step S1509, i.e., if the tilt movement amount dy has a negative value, the composition determination unit 306 calculates the tilt driving angle dt from a unit driving angle in the negative direction (in the present exemplary embodiment, −0.100), the relative angle of view aov(zp) at the zoom position zp, and the relative angle of view aov(0) at the zoom position of 0 by using the following equation:

$$dt = -0.100 \times (aov(zp)/aov(0)).$$

In step S1510, i.e., if the tilt movement amount dy has a positive value, the composition determination unit 306 similarly calculates the tilt driving angle dt from a unit driving angle in the positive direction (in the present exemplary embodiment, 0.100), the relative angle of view aov(zp) at the zoom position zp, and the relative angle of view aov(0) at the zoom position of 0 by using the following equation:

$$dt = 0.100 \times (aov(zp)/aov(0)).$$

As described above, similar to the pan driving, the tilt driving angle dt varies depending on the zoom position zp, but magnitude of tilt driving is basically the same. As described above, the composition adjustment processing is periodically performed in synchronization with the imaging period of the imaging unit 302. Thus, processing for gradually brining a face position closer to a target position is implemented by repeating the processing of steps S401 to S404 a plurality of times.

Next, the method for obtaining the target zoom position tzp in step S505 will be described. The target zoom position tzp is determined based on the face size(s) and face position(s) of the target object(s), and a target face size and a target object region determined for a composition pattern to be used for imaging.

FIG. 16 is a chart for describing a relationship between the target face size and the size of the target object region (hereinafter, referred to simply as a target object region) for each composition pattern according to the present exemplary embodiment. In the present exemplary embodiment, the image capture apparatus 100 has three composition patterns. The target face size and the target object region are set so that the face size(s) and the size of an object region in capturing an object or objects within the field of view vary depending on the composition pattern. Information about the target face sizes and target object regions associated with the composition patterns as illustrated in FIG. 16 is stored in a not-illustrated memory. The target face size and the target object region corresponding to the composition pattern set for the next automatic shooting can be obtained by referring to the information. The composition pattern is sequentially switched each time a single round of automatic shooting ends. After imaging is performed by using the composition pattern "medium", the composition pattern is switched to "large". After imaging is performed by using the composition pattern "large", the composition pattern returns to "small".

The target face size indicates a target value for the ratio of the face size of an object to the captured image data (face size/horizontal resolution×100). Predetermined target values are stored in the memory in advance. For example, if the composition pattern is "Small", the target face size is 5% to 10% (median of 7.5%), i.e., 48 to 96 pixels (median of 72 pixels). In the present exemplary embodiment, the zoom position zp is calculated so that the face size of the target object closest to the center falls within the range of the target face size.

The target object region indicates a target value for the ratio of the size of an object region to the horizontal resolution of the image data. Again, predetermined target values are stored in the memory in advance. The object region refers to a region where the target object(s) is/are present. The size of the object region is a value indicating a horizontal distance from the left edge to the right edge of the region where the target object(s) is/are present in terms of the number of pixels. More specifically, if there is a plurality of target objects, the size of the object region indicates the number of pixels from the horizontal coordinate position at the left edge of the target object having the smallest horizontal position (i.e., the leftmost target object) to the horizontal coordinate position at the right edge of the target object having the largest horizontal position (i.e., the rightmost target object). If there is one target object, the face size serves as the size of the object region. If, for example, the composition pattern is "Medium", the target object region is less than or equal to a predetermined value of 70%. This means that the target object(s) is/are located within the range of 672 pixels.

Adjusting the composition so that the target object(s) falls/fall within the target object region can leave a blank space in a specific area at both edges of the screen or one of the left and right edges of the screen. This facilitates detection of another object lying near the target object(s). If the composition pattern is "Large", the target object region is not set, and the target zoom position tzp is calculated by referring only to the target face size.

Figure 17:
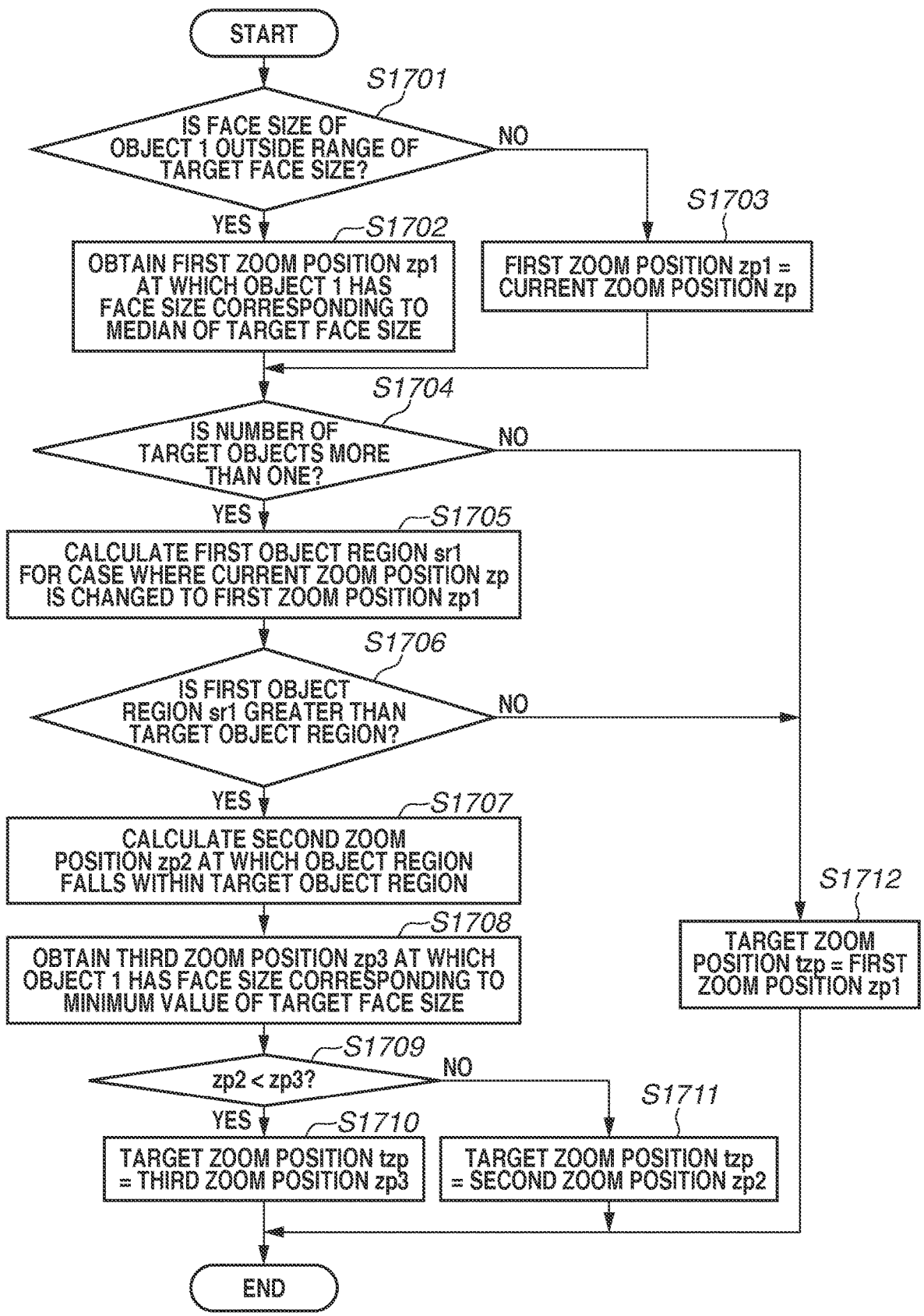
FIG. 17 is a flowchart for describing processing for obtaining a target zoom position according to the first exemplary embodiment.

FIG. 17 is a flowchart for describing the processing through which the composition determination unit 306 according to the present exemplary embodiment obtains the target zoom position tzp, i.e., step S505. Processing for calculating the target zoom position tzp from the current zoom position zp, the relative angle of view aov(zp), the target face size, and the target object region will be described with reference to FIG. 17.

First, in step S1701, the composition determination unit 306 determines whether the face size of the object 1 is outside the range of the target face size, i.e., less than the minimum value or greater than the maximum value. If the face size is outside the range of the target face size (YES in step S1701), the processing proceeds to step S1702. If the face size falls within the range of the target face size (NO in step S1701), the processing proceeds to step S1703.

In step S1702, i.e., if the face size of the object 1 is outside the range of the target face size, first, the composition determination unit 306 obtains a first zoom position zp1 at which the object 1 has the face size corresponding to the median of the target face size. More specifically, first, the composition determination unit 306 calculates a target relative angle of view aov(zp1) from the relative angle of view aov(zp) at the current zoom position zp by using the following equation:

$$aov(zp1)=fs \times aov(zp)/tfs,$$

where fs is the face size and tfs is the target face size.

If aov(zp1) is less than aov(zp), i.e., the lens unit 301 is driven to the telephoto side, the composition determination unit 306 refers to the values of aov(zp) one by one to the telephoto side, starting at the current zoom position zp. The composition determination unit 306 determines the zoom position zp at which aov(zp) first becomes less than or equal to aov(zp1) as the first zoom position zp1. On the other hand, if aov(zp1) is greater than aov(zp), i.e., the lens unit 301 is driven to the wide angle side, the composition determination unit 306 refers to the values of aov(zp) one by one to the wide angle side, starting at the current zoom position zp. The composition determination unit 306 determines the zoom position zp at which aov(zp) first becomes greater than or equal to aov(zp1) as the first zoom position zp1.

For example, in a case where the object 1 has a face size fs of 80 pixels, the current zoom position zp is 0, the composition pattern is "Medium", and the target face size tfs is the median 12.5% (=120 pixel), first, the composition determination unit 306 calculates the target relative angle of view aov(zp1) by the following equation:

$$aov(zp1)=80 \times 1000/120=667.$$

Since aov(zp1)<aov(zp), aov(58)=669, and aov(59)=665, the first zoom position zp1 is determined to be 59.

If the calculated aov(zp1) is less than the minimum value of aov(zp) (here, 500), the first zoom position zp1 is set to the telephoto-side maximum value of 100. On the other hand, if the calculated aov(zp1) is greater than the maximum value of aov(zp) (here, 1000), the first zoom position zp1 is set to the wide angle-side minimum value of 0.

In step S1703, i.e., if the face size of the object 1 is determined to fall within the range of the target face size in step S1701, the composition determination unit 306 sets the current zoom position zp as the first zoom position zp1.

In step S1704, the composition determination unit 306 determines whether the number of target objects is more than one. If the number of target objects is more than one (YES in step S1704), the composition determination unit 306 determines that the target zoom position tzp needs to be determined by taking the object region into account, and the processing proceeds to step S1705. If the number of target objects is one (NO in step S1704), the object region does not need to be taken into account since the set target face size is smaller than the target object region. In such a case, the processing proceeds to step S1712. In step S1712, the composition determination unit 306 substitutes the first zoom position zp1 into the target zoom position tzp. The processing of step S505 ends.

If the object region is taken into account in determining the target zoom position tzp, then in steps S1705 to S1711, the composition determination unit 306 determines whether the size of the object region exceeds a ratio set as the target object region when the lens unit 301 is moved to the first zoom position zp1. If the size of the object region exceeds the ratio, a position where the size of the object region does not exceed the ratio is set as the target zoom position tzp.

First, in step S1705, the composition determination unit 306 calculates a first object region that is the ratio of the object region in a case where the current zoom position zp is changed to the calculated first zoom position zp1. Specifically, the composition determination unit 306 calculates a first object region sr1 from the relative angle of view aov(zp) at the current zoom position zp and the relative angle of view aov(zp1) at the first zoom position zp1 by the following equation:

$$sr1=sr \times aov(zp)/aov(zp1),$$

where sr is the current object region.

For example, in a case where the current object region sr is 460 pixels, the current zoom position zp is 0, the relative angle of view aov(0) is 1000, the first zoom position zp1 is 59, and the relative angle of view aov(59) is 665:

$$sr1=460 \times 1000/665=692.$$

In other words, if the zoom position zp is changed from 0 to 59, the object region changes from 460 pixels to 692 pixels. If the first zoom position zp1 and the current zoom position zp coincide, the current object region sr is simply used as the first object region sr1 without calculation. With the first object region sr1 obtained, the present step S1705 ends, and the processing proceeds to step S1706.

In step S1706, the composition determination unit 306 determines whether the first object region sr1 is greater than the target object region. If the first object region sr1 is greater than the target object region (YES in step S1706), the composition determination unit 306 determines that the target zoom position tzp needs to be obtained based on the target object region, and the processing proceeds to step S1707. If the first object region sr1 is less than or equal to the target object region (NO in step S1706) or if the composition pattern is "Large" and no adjustment is made based on the target object region, the processing proceeds to step S1712. In step S1712, the composition determination unit 306 substitutes the first zoom position zp1 into the target zoom position tzp. The processing ends.

In step S1707, i.e., if the target zoom position tzp is to be obtained based on the target object region, the composition determination unit 306 calculates a second zoom position zp2 at which the object region falls within the target object region. More specifically, the composition determination unit 306 calculates a target relative angle of view aov(zp2) from the first object region sr1 and the relative angle of view aov(zp1) at the first zoom position zp1 by the following equation:

$$aov(zp2)=sr1 \times aov(zp1)/tsr,$$

where tsr is the target object region.

For example, in a case where the composition pattern is "Medium", the target object region tsr is 70% (=672 pixels), the first object region sr1 is 692 pixels (=72%), the first zoom position zp1 is 59, and the relative angle of view aov(59) is 665:

$$aov(zp2)=692\times 665/672=685.$$

The composition determination unit 306 refers to the values of aov(zp) one by one to the wide angle side, starting at the first zoom position zp1, and determines the zoom position zp at which aov(zp) first becomes greater than or equal to 685 as the second zoom position zp2. In this example, aov(55) =683 and aov(54)=668, whereby the second zoom position zp2 is determined to be 54.

In step S1708, the composition determination unit 306 obtains a third zoom position zp3 at which the object 1 has a face size corresponding to the minimum value of the target face size. The third zoom position zp3 is obtained to set a limit value for the wide angle-side zoom position in the current composition pattern.

The calculation method is similar to that described in step S1702. For example, a case is cited where the face size fs of the object 1 is 80 pixel, the current zoom position zp is 0, the composition pattern is "Medium", and the target face size tfs is a minimum value of 10% (=96 pixels). In such a case:

$$aov(zp3)=80\times 1000/96=833.$$

The composition determination unit 306 refers to the values of aov(zp) one by one to the telephoto side, starting at the current zoom position of 0, and determines the zoom position zp at which aov(zp) first becomes less than or equal to 833 as the third zoom position zp3. In this example, aov (26)=835 and aov(27)=829, whereby the third zoom position zp3 is determined to be 27.

As with the calculation of aov(zp1), if the calculated aov(zp2) or aov(zp3) is less than the minimum value of aov(zp) (here, 500), the second or third zoom position zp2 or zp3 is set to the telephoto-side maximum value of 100. On the other hand, if the calculated aov(zp2) or aov(zp3) is greater than the maximum value of aov(zp) (here, 1000), the second or third zoom position zp2 or zp3 is set to the wide angle-side minimum value of 0.

In step S1709, with the second and third zoom positions zp2 and zp3 obtained, the composition determination unit 306 determines whether the second zoom position zp2 is smaller than the third zoom position zp3 (i.e., zp2<zp3). The determination is intended to determine whether the second zoom position zp2 for confining the object region within the target object region tsr exceeds the limit value of the wide angle-side zoom position corresponding to the composition pattern. If the second zoom position zp2 exceeds the limit value of the wide angle-side zoom position corresponding to the composition pattern (YES in step S1709), the processing proceeds to step S1710. If not (NO in step S1709), the processing proceeds to step S1711.

If the second zoom position zp2 exceeds the limit value of the wide angle-side zoom position corresponding to the composition pattern and the zoom position zp is set to the second zoom position zp2 (i.e., zp2<zp3), the face size of the object 1 becomes smaller than the minimum value of the target face size corresponding to the composition pattern. Thus, the composition determination unit 306 determines that the second zoom position zp2 for confining the object region within the target object region is unable to be set as the target zoom position tzp. Then, in step S1710, the composition determination unit 306 sets the target zoom position tzp to the third zoom position zp3 that is the limit value of the wide angle-side zoom position corresponding to the composition pattern. In such a case, the size of the object region becomes greater than the target object region tsr associated with the composition pattern.

By contrast, in step S1711, i.e., if the second zoom position zp2 does not exceed the limit value of the wide angle-side zoom position corresponding to the composition pattern (i.e., zp2=>zp3), the composition determination unit 306 sets the second zoom position zp2 for confining the object region within the target object region tsr as the target zoom position tzp.

As described above, the zoom position zp is adjusted so that the face of a target object falls within the range of the target face size. Even if the target object approaches or recedes from the camera (image capture apparatus 100), the object 1 can thus be kept track of and captured in composition of the same face size.

If there is a plurality of target objects, the zoom position zp is adjusted to a wider angle based on the target object region tsr so that the composition is adjusted to leave a blank space of a certain amount or more. This can facilitate recognition of another object lying near the target objects. A specific effect will be described with reference to FIGS. 20A to 20D.

FIGS. 18A to 20D are diagrams for describing examples of the object information about the target object(s), the zoom position zp, and the composition pattern according to the present exemplary embodiment, and specific examples of the target zoom position tzp obtained.

Referring to FIGS. 18A to 18C, an example where the zoom position zp is moved to the telephoto side based on the target face size will be described. FIG. 18A is a diagram illustrating an example of image data input to the object detection unit 305 in a case where there is only one target object. FIG. 18B is a chart illustrating the object information about the target object corresponding to the image data of FIG. 18A, the current zoom position zp, and the composition pattern set for the next automatic shooting.

The target face size for the composition pattern "Large" is 15% to 20%, and the object 1 has a face size of 120 pixels (=12.5%), i.e., outside the range of the target face size. Thus, the composition determination unit 306 calculates the first zoom position zp1 in step S1702 of FIG. 17. Since the median of the target face size is 17.5% (=168 pixels) and aov(30) at the zoom position zp of 30 is 812, the relative angle of view aov(zp1) is given by:

$$aov(zp1)=120\times 812/168=580.$$

The composition determination unit 306 refers to the values of aov(zp) one by one to the telephoto side, starting at the current zoom position zp of 30, and determines the zoom position zp at which aov(zp) first becomes less than or equal to 580 as the first zoom position zp1. In this example, aov(78)=583 and aov(79)=579, whereby the first zoom position zp1 is determined to be 79. Since the number of target objects is one, the target zoom position tzp is set to the first zoom position zp1 of 79 in step S1712 of FIG. 17.

FIG. 18C is a diagram illustrating an example of the target composition in a case where the zoom position zp is moved based on the target zoom position tzp. As illustrated in FIG. 18C, the face of the target object can be captured in a relatively large size.

Referring to FIGS. 19A to 19C, an example where the zoom position zp is moved to the wide angle side based on the target face size will be described. FIG. 19A is a diagram illustrating an example of image data input to the object detection unit 305 in a case where there is a plurality of target objects. FIG. 19B is a chart illustrating the object information about the target objects corresponding to the image data of FIG. 19A, the current zoom position zp, and the composition pattern set for the next automatic shooting.

The target face size for the composition pattern "Small" is 5% to 10%, and the object 1 has a face size of 120 pixels (=12.5%), i.e., outside the range of the target face size. Thus, the composition determination unit 306 calculates the first zoom position zp1 in step S1702 of FIG. 17. Since the median of the target face size is 7.5% (=72 pixels) and aov(70) at the zoom position zp of 70 is 616, the relative angle of view aov(zp1) is given by:

$$aov(zp1)=120\times616/72=1026.$$

The calculation exceeds the maximum value of aov(zp), 1000, whereby the first zoom position zp1 is determined to be 0.

Since the number of target objects is three, the composition determination unit 306 calculates the first object region sr1 in step S1705 of FIG. 17. The target object located at the smallest horizontal position (leftmost target object in the diagram) in the current object region sr is the object 2. The face positions (x, y) in the object information about the target objects illustrated in FIG. 19B refer to the center positions of the faces. Thus, the horizontal coordinate position at the left edge of the object 2 is 220−120/2=160. The target object located at the largest horizontal position (rightmost target object in the diagram) is the object 3. Similarly, the horizontal coordinate position at the right edge of the object 3 is 720+120/2=780. Thus, the number of pixels from the horizontal coordinate position at the left edge to that at the right edge, i.e., the current object region sr is 620 pixels.

Since the current object region sr is 620 pixels, the current zoom position zp is 70, the relative angle of view aov(70) is 616, the first zoom position zp1 is 0, and the relative angle of view aov(0) is 1000, the first object region sr1 is given by:

$$sr1=620\times616/1000=382.$$

Since the obtained sr1 is less than 768 pixels (=960×0.8) that is the target object region tsr for the composition pattern "Small", the first zoom position zp1 of 0 is obtained as the target zoom position tzp.

FIG. 19C is a diagram illustrating an example of the target composition in a case where the zoom position zp is moved based on the target zoom position tzp. As illustrated in FIG. 19C, the background around the target objects can also be captured.

Referring to FIGS. 20A to 20D, an example where the zoom position zp is moved to the wide angle side based on the target face size and the target object region will be described. FIG. 20A is a diagram illustrating an example of image data input to the object detection unit 305 in a case where there is a plurality of target objects.

FIG. 20B is a chart illustrating the object information about the target objects corresponding to the image data of FIG. 20A, the current zoom position zp, and the composition pattern set for the next automatic shooting.

The target face size for the composition pattern "Medium" is 10% to 15%, and the object 1 has a face size of 120 pixels (=12.5%), i.e., within the range of the target face size. Thus, the composition determination unit 306 substitutes the current zoom position zp (=50) into the first zoom position zp1 in step S1703 of FIG. 17.

Since the number of target objects is five, the composition determination unit 306 calculates the first object region sr1 in step S1705 of FIG. 17. The current object region sr is given by the number of pixels from the horizontal coordinate position at the left edge of the object 5 located at the smallest horizontal position, or 120−120/2=60, to the horizontal coordinate position at the right edge of the object 4 located at the largest horizontal position, or 810+120/2=870, i.e., 810 pixels.

Since the first zoom position zp1 is the same as the current zoom position zp, the first object region sr1 is the same as the current object region, 810 pixels. The first object region sr1 is greater than the target object region for the composition pattern "Medium", i.e., 672 pixels (=960×0.7). Thus, the composition determination unit 306 calculates, in step S1707 of FIG. 7, the second zoom position zp2 at which the object region falls within the target object region tsr.

Since the target object region tsr is 672 pixels, the first object region sr1 is 810 pixels, and the relative angle of view aov(50) at the first zoom position zp1 of 50 is 707, the relative angle of view aov(zp2) at the second zoom position zp2 is given by:

$$aov(zp2)=810\times707/672=852.$$

The composition determination unit 306 refers to the values of aov(zp) one by one to the wide angle side, starting at the first zoom position zp1, and determines the zoom position zp at which aov(zp) first becomes greater than or equal to 852 as the second zoom position zp2. In this example, aov(24)=847 and aov(23)=853, whereby the second zoom position zp2 is determined to be 23.

Then, the composition determination unit 306 calculates, in step S1708 of FIG. 17, the third zoom position zp3 at which the object 1 has a face size corresponding to the minimum value of the target face size. Since the object 1 has a face size fs of 120 pixels, the current zoom position zp is 50, the composition pattern is "Medium", and the target face size tfs is the minimum value of 10% (=96 pixels), the relative angle of view aov(zp3) at the third zoom position zp3 is given by:

$$aov(zp3)=120\times707/96=884.$$

The composition determination unit 306 refers to the values of aov(zp) one by one to the telephoto side, starting at the zoom position zp of 0, and determines the zoom position zp at which aov(zp) first becomes less than or equal to 884 as the third zoom position zp3. In this example, aov(17)=889 and aov(18)=883, whereby the third zoom position zp3 is 18.

Since the second zoom position zp2 of 26 is greater than the third zoom position zp3 of 18, the face size at the second zoom position zp2 falls within the range of the target face size. Thus, the composition determination unit 306 obtains, in step S1711 of FIG. 17, the second zoom position zp2 as the target zoom position tzp.

FIG. 20C is a diagram illustrating an example of the target composition in a case where the zoom position zp is moved based on the target zoom position tzp. FIG. 20D is a diagram illustrating an example where another object is successfully detected by performing the target object determination processing on image data obtained after the zoom position zp of the lens barrel 101 is moved to adjust the field of view to the target composition illustrated in FIG. 20C. As illustrated in FIG. 20D, the target objects can be captured within a partial region in the field of view by controlling the zoom position zp so that the object region falls within the target object region. This can increase the blank space on-screen, or blank space in the image data, which is a region occupied by an object other than the target objects and the background including no target object to detect, compared to a case where the target objects occupy the entire field of view (i.e., the target object range is 100). Increasing the blank space can enable detection of another new object that would not be detectable in the composition before the zoom position control, such as in the composition illustrated in FIG. 20A. The new object detected has a similar face size and face position to those of the object 4 set as a target object, and is thus set as a target object in the next composition determination (step S403). If there is still another object on the left (on the right in the diagram) of the new object detected, that object can thus be detected as well.

The image capture apparatus 100 according to the present exemplary embodiment can change the position of the target object in the field of view by pan driving and tilt driving as well as change the size of the target object by zoom driving. Without pan and tilt driving capabilities, the image capture apparatus 100 could cause malfunction such as losing track of a target object because of the zoom driving depending on the position of the target object. For example, a case is cited where the object 1 has a face size smaller than the minimum value of the target face size and the object region is sufficiently smaller than the target object region so that the zoom position zp may desirably be driven to the telephoto side, whereas the object region has horizontal coordinates of 780 to 950, i.e., is located to the right. In this case, if an image capture apparatus not capable of pan driving performs the zoom driving to the telephoto side to achieve the target face size, a target object exceeds the field of view and goes out of frame on the right. If, as a countermeasure, the zoom magnification is limited based on the object position to prevent the target object from going out of frame, the target face size fails to be achieved. The image capture apparatus 100 according to the present exemplary embodiment is capable of pan driving and tilt driving, and can change the zoom position zp while changing the shooting direction based on the object position and face orientation. This enables adjustment of the composition so that the face size of the object 1 becomes the target face size regardless of the object position. Because of such pan, tilt, and zoom driving capabilities, the image capture apparatus 100 according to the present exemplary embodiment can obtain the target zoom position tzp based on the size of the object region regardless of the position(s) of the target object(s) within the field of view.

In the present exemplary embodiment, horizontal resolution is used as a reference with regard to the ratio of the face size and the ratio of the object region. However, this is not restrictive, and resolution in the tilt direction may be used as a reference.

In the present exemplary embodiment, the horizontal position(s) of the target object(s) in the field of view is/are described to be changed based on the face orientation(s) of the target object(s). However, the vertical position(s) may be controlled as well. The target face position can be set so that if the target object faces upward, the face position of the target object is located close to the lower edge of the field of view to increase the blank space in an upper part compared to when the target object faces forward. Similarly, the target face position can be set so that if the target object faces downward, the face position of the target object is located close to the upper edge of the field of view to increase the blank space in a lower part compared to when the target object faces forward. In other words, the shooting direction can be controlled by setting the target face position so that if the target object faces in a first direction, a distance between the edge of the field of view on the first direction side and the target object increases compared to when the target object faces forward. The edge of the field of view on the first direction side refers to an intersection of the first direction and an edge of the field of view. If the first direction is the leftward direction when seen from the image capture apparatus 100 (with the target object and the image capture apparatus 100 opposed to each other, the rightward direction when seen from the target object), the edge of the field of view on the first direction side refers to the left edge. For example, in the case of FIG. 10E where the target object is located at coordinates (768, 270) and faces to the left in the image data, the edge of the field of view on the first direction side refers to the coordinates at the left edge, (0, 270).

In the present exemplary embodiment, the composition is determined by referring to the face orientation of the object as the orientation of the object. However, the present invention is not limited thereto, and other feature information indicating an orientation using a part of the body may be referred to as the direction of the object. Examples include the direction of the line of sight of the object, the orientation of the body, the direction indicated by a finger, and the direction indicated by an arm. Further, the direction of the object estimated by using a plurality of such pieces of feature information may be referred to as well.

Second Exemplary Embodiment

A second exemplary embodiment describes an example where automatic shooting is immediately followed by search processing to facilitate detection of an object outside a field of view. The search processing includes temporarily adjusting a zoom position so as to increase an angle of view. In the present exemplary embodiment, the search processing is performed after the automatic shooting is performed by determining the shooting direction based on the detected face orientation(s) and determining the target zoom position based on the detected face size(s) as in the first exemplary embodiment. A system configuration according to the present exemplary embodiment is similar to that of the first exemplary embodiment. Thus, a description thereof will be omitted. Differences from the first exemplary embodiment will be described below.

FIG. 21 is a flowchart for describing composition determination processing by the composition determination unit 306 according to the present exemplary embodiment. The processing of steps S501 to S505 is similar to that of the first exemplary embodiment. Thus, a detailed description thereof will be omitted.

In step S501, the composition determination unit 306 determines a target object or objects. If the number of target objects is determined to be one or more (YES in step S502), the processing proceeds to step S2101. In step S2101, the composition determination unit 306 determines whether the current state is immediately after imaging. More specifically, the composition determination unit 306 determines whether the current frame is the first frame after the previous automatic shooting. If the current state is not immediately after the imaging (NO in step S2101), the processing proceeds to step S503 to perform composition determination processing similar to that of the first exemplary embodiment. If the current state is immediately after the imaging (YES in step S2101), the processing proceeds to step S2102.

In step S2102, the composition determination unit 306 calculates a search zoom position izp for temporarily increasing the angle of view before composition determination. The search zoom position izp is a zoom position zp at which the target object(s) is/are captured in the size capable of continuing the detection of the target object(s) while the angle of view is maximized. In the present exemplary embodiment, an example where the minimum face size capable of continuing the detection of a target object is 5% of the horizontal screen resolution will be described. The composition determination unit 306 calculates the search zoom position izp so that the face size of the target object having the smallest face size among the target object(s determined in step S501 becomes 5% (=48 pixels) or more.

Specifically, a target relative angle of view aov(izp) is calculated from the current minimum face size mfs of the target object(s) and the relative angle of view aov(zp) at the current zoom position zp by using the following equation:

aov($izp$)=mfs×aov(zp)/tfs, where tfs is the target face size.

A case is cited where the minimum face size mfs is 60 pixels, the current zoom position zp is 80, and the relative angle of view aov(80) is 575. Since the target face size tfs is 48 pixels, the target relative angle of view aov(izp) is given by:

aov($izp$)=60×575/48=719.

The composition determination unit 306 refers to the values of aov(zp) one by one to the wide angle side, starting at the current zoom position zp, and determines the maximum zoom position zp satisfying that aov(zp) is 719 or less as the search zoom position izp. In this example, aov(48)=717 and aov(47) is 722, whereby the search zoom position izp is determined to be 48.

Referring to FIGS. 22A to 22D, an example of calculating the search zoom position izp and controlling the zoom position zp to the wide angle side will be described. FIG. 22A is a diagram illustrating an example of image data input to the object detection unit 305 in a case where there is a plurality of target objects. FIG. 22B is a chart illustrating the object information about the target objects corresponding to the image data of FIG. 22A and the current zoom position zp. In this example, the minimum face size mfs is the face size of the object 3, 90 pixels.

Since the target face size tfs is 48 pixels, the minimum face size mfs is 90 pixels, and the relative angle of view aov(100) at the current zoom position zp of 100 is 500, the relative angle of view aov(izp) at the search zoom position izp is given by:

aov($izp$)=90×500/48=938.

The composition determination unit 306 refers to the values of aov(zp) one by one to the wide angle side, starting at the current zoom position zp, and determines the maximum zoom position zp satisfying that aov(zp) is 938 or less as the search zoom position izp. In this example, aov(10)=933 and aov(9)=940, whereby the search zoom position izp is determined to be 10. The composition determination unit 306 outputs the search zoom position izp as the target zoom position tzp to the driving control unit 307. The driving control unit 307 and the lens driving unit 309 move the zoom position zp to the search zoom position izp.

FIG. 22C is a diagram illustrating an example of the composition in the case where the zoom position zp is moved with the search zoom position izp as the target zoom position tzp. FIG. 22D is a diagram illustrating an example where other objects are successfully detected by taking the composition illustrated in FIG. 22C. As illustrated in FIG. 22D, the zoom position zp is adjusted so that the target objects can continue to be detected and the angle of view is maximized, whereby the blank space on-screen is maximized. This can enable detection of another new object not detectable in the composition of FIG. 22A. If the angle of view is maximized or increased to a predetermined position regardless of the face sizes of the target objects and the peripheries of the target objects are searched, an object existing in the field of view can become too small to be detected. By contrast, determining the search zoom position izp based on the face sizes of the target objects as in the present exemplary embodiment can reduce the possibility that the object is too small to be detected.

As described above, in the present exemplary embodiment, the chances for an image capture apparatus such as a digital camera having pan, tilt, and zoom control mechanisms to detect an object outside the angle of view can be increased by temporarily adjusting the zoom position so as to increase the angle of view immediately after shooting.

Modification

In the first and second exemplary embodiments, the object information is described to be information about the features of human faces. However, this is not restrictive, and feature information about a non-human object such as an animal or a thing may be used as the object information.

FIGS. 23A to 23F are diagrams and charts illustrating an example where face information about an animal can be detected in addition to face information about a human. The object information and the method for adjusting the composition are similar to those illustrated in FIGS. 11A to 11F according to the first exemplary embodiment. Thus, a detailed description thereof will be omitted. FIG. 23A is a diagram illustrating an example of image data input to the object detection unit 305. FIG. 23B is a chart illustrating the object information about the target object corresponding to the image data of FIG. 23A. FIG. 23C is a diagram schematically illustrating a positional relationship between the face position (690, 390) of the object 1 and the target face position (192, 270) illustrated in FIG. 8C. FIG. 23D is a chart illustrating the pan and tilt movement amounts dx(1) and dy(1) of the object 1 and the pan and tilt movement amounts dx and dy output as a final result. FIG. 23E is a diagram illustrating an example of the target composition in a case where the lens barrel 101 is moved in the pan and tilt directions based on FIG. 23D. FIG. 23F is a diagram illustrating an example where another object is successfully detected in the target composition. A target face position different from the target face position for a human may be set for an animal or a thing. While the target face position for a human is set based on the orientation of the object, the same target face position may be set for an animal regardless of the orientation of the object. If there is a mixture of animal, thing, and human objects, averages may be calculated by assigning higher weights to the pan and tilt movement amounts dx(n) and dy(n) obtained from the human object instead of simply averaging all the pan and tilt movement amounts dx(n) and dy(n).

In the first and second exemplary embodiments, the lens barrel 101 including the imaging unit 302 is described to be rotated about both the X- and Y-axes to enable both the pan driving and tilt driving. However, an exemplary embodiment of the present invention is applicable if the lens barrel 101 can be rotated about one of the axes instead of being rotatable about both the X- and Y-axes. For example, if the lens barrel 101 can be rotated about the Y-axis, the pan driving can be performed based on the orientation(s) of the target object(s) as described above.

The first and second exemplary embodiments have been described by using the image capture apparatus 100 where the lens barrel 101 including the imaging optical system and the image sensor is integrated with the shooting control apparatus for controlling the shooting direction of the lens barrel 101 as an example. However, the present invention is not limited thereto. For example, the image capture apparatus 100 may have an interchangeable-lens configuration.

Similar functions can be implemented by fixing an image capture apparatus to a camera platform including rotation mechanisms for driving the fixed image capture apparatus in pan and tilt directions. As long as the image capture apparatus has an imaging function, the image capture apparatus may have another function. For example, a smartphone having an imaging function and a camera platform to which the smartphone can be fixed can be combined to constitute a similar configuration to the configurations of the first and second exemplary embodiments. Moreover, the lens barrel 101 and the rotation mechanisms (tilt and pan rotation units 102 and 103) do not necessarily need to be physically connected to the control box 104. For example, the rotation mechanisms and the zoom function may be controlled via wireless communications such as Wi-Fi.

While the exemplary embodiments of the present invention have been described above, the present invention is not limited to such exemplary embodiments, and various changes and modifications may be made without departing from the gist of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-176641, filed on Sep. 27, 2019, which is hereby incorporated by reference herein in its entirety.

What is claimed is:

1. A shooting control apparatus comprising one or more processors and/or circuitry which function as:
   an object detection unit configured to obtain image data from an imaging unit that obtains the image data based on light from an imaging optical system, and detect an object from the image data; and
   a control unit configured to control rotational driving of the imaging unit and a zoom mechanism included in the imaging optical system based on a result of detection of the object performed by the object detection unit,
   wherein the control unit determines a target zoom position and a shooting direction of the imaging unit so that the object falls within a partial region of a field of view of the imaging unit including a center of the field of view, based on a size and position of the object, and controls the rotational driving of the imaging unit and the zoom mechanism based on the target zoom position and the shooting direction.

2. The shooting control apparatus according to claim 1, wherein the control unit obtains an object region based on the result of the detection performed by the object detection unit, and determines the target zoom position based on a size of the object region.

3. The shooting control apparatus according to claim 2, wherein the size of the object region is based on information about at least one of: (i) a distance from a left edge of an object closest to a left edge of the field of view of the imaging unit to a right edge of an object closest to a right edge of the field of view and (ii) a distance from an upper edge of an object closet to an upper edge of the field of view to a lower edge of an object closest to a lower edge of the field of view.

4. The shooting control apparatus according to claim 2, wherein the one or more processors and/or circuitry further function as a determination unit configured to determine one or more target objects from among objects detected by the object detection unit, and
   wherein the control unit obtains the object region based on information about the one or more target objects determined by the determination unit.

5. The shooting control apparatus according to claim 4, wherein the control unit obtains the size of the object region based on information about at least one of: (i) a distance from a left edge of an object closest to a left edge of the field of view of the imaging unit among the one or more target objects to a right edge of an object closest to a right edge of the field of view among the one or more target objects and (ii) a distance from an upper edge of an object closest to an upper edge of the field of view among the one or more target objects to a lower edge of an object closest to a lower edge of the field of view among the one or more target objects.

6. The shooting control apparatus according to claim 2, wherein the control unit determines the target zoom position so that a ratio of the object region to the field of view is less than or equal to a predetermined value.

7. The shooting control apparatus according to claim 6, wherein the predetermined value is determined based on a target size of the object in image data to be obtained next.

8. The shooting control apparatus according to claim 2, wherein the control unit determines the target zoom position based on the size of the object region and the size of the object.

9. The shooting control apparatus according to claim 1, wherein the object detection unit is further configured to detect an orientation of the detected object, and
wherein the control unit determines the shooting direction based on the position of the object and the orientation of the object detected by the object detection unit.

10. The shooting control apparatus according to claim 1, wherein the control unit controls the imaging unit to perform automatic shooting based on information about the object detected by the object detection unit.

11. The shooting control apparatus according to claim 1, wherein the control unit is further configured to:
perform search processing for searching for an object not included in the field of view;
obtain, in the search processing, a search zoom position based on the size of the detected object, the search zoom position maximizing an angle of view as far as the detected object is detectable; and
control the zoom mechanism based on the search zoom position.

12. The shooting control apparatus according to claim 1, wherein the object detection unit detects a person as the object from the image data.

13. The shooting control apparatus according to claim 1, wherein the shooting direction is an optical axis direction of the imaging optical system or a direction corresponding to the optical axis direction.

14. The shooting control apparatus according to claim 1, wherein the object detection unit detects the object again from image data obtained from the imaging unit after the rotational driving and the zoom mechanism are controlled by the control unit.

15. The shooting control apparatus according to claim 1, wherein the control unit controls the zoom mechanism after controlling the rotational driving.

16. An image capture apparatus comprising:
an imaging unit; and
a rotation mechanism for performing at least one of pan driving and tilt driving by rotating the imaging unit about at least one or more axes,
the shooting control apparatus according to claim 1;
wherein the control unit of the shooting apparatus controls the shooting direction by controlling the rotation mechanism.

17. A shooting control method comprising:
obtaining image data from an imaging unit including an image sensor configured to obtain the image data based on light from an imaging optical system;
detecting an object from the image data; and
controlling a shooting direction of the imaging unit and a zoom position of the imaging optical system by controlling rotational driving of the imaging unit and a zoom mechanism included in the imaging optical system,
wherein the controlling includes determining a target zoom position and the shooting direction of the imaging unit so that the object falls within a partial region of a field of view of the imaging unit including a center of the field of view, based on a size and position of the object, and controlling the rotational driving and the zoom mechanism based on the target zoom position and the shooting direction.

* * * * *